United States Patent
Agarwal et al.

(10) Patent No.: US 10,887,051 B2
(45) Date of Patent: Jan. 5, 2021

(54) REAL TIME MIC RECOVERY

(71) Applicant: QUALCOMM Incorporated, San Diego, CA (US)

(72) Inventors: Vishal Agarwal, Ramnagar (IN); Giriraj Goyal, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 16/239,361

(22) Filed: Jan. 3, 2019

(65) Prior Publication Data

US 2020/0220655 A1    Jul. 9, 2020

(51) Int. Cl.

| | |
|---|---|
| *H04L 1/00* | (2006.01) |
| *H04W 12/10* | (2009.01) |
| *H04L 29/06* | (2006.01) |
| *H04W 28/04* | (2009.01) |
| *H04L 1/16* | (2006.01) |
| *H04W 12/00* | (2009.01) |
| *H04L 12/26* | (2006.01) |

(52) U.S. Cl.
CPC .......... *H04L 1/0061* (2013.01); *H04L 1/1621* (2013.01); *H04L 43/12* (2013.01); *H04L 63/123* (2013.01); *H04W 12/0013* (2019.01); *H04W 12/1006* (2019.01); *H04W 28/04* (2013.01)

(58) Field of Classification Search
CPC ............ H04L 1/0061; H04W 12/1006; H04W 12/0013
See application file for complete search history.

(56) References Cited

U.S. PATENT DOCUMENTS

| | | | |
|---|---|---|---|
| 6,560,219 B1 * | 5/2003 | Tabu | H04J 3/1611 |
| | | | 370/352 |
| 9,729,350 B1 * | 8/2017 | Cohn | H04L 12/5601 |
| 9,800,589 B1 * | 10/2017 | Asveren | H04L 63/1408 |
| 9,949,065 B1 * | 4/2018 | Zarakas | G06Q 20/327 |
| 10,206,039 B1 * | 2/2019 | Yun | G06F 3/165 |
| 10,231,126 B2 * | 3/2019 | Chan | H04W 12/04 |
| 10,244,307 B1 * | 3/2019 | Tong | H04W 76/10 |
| 10,542,574 B1 * | 1/2020 | Jorgovanovic | H04W 76/20 |
| 10,555,170 B2 * | 2/2020 | Sun | H04L 63/061 |
| 10,587,491 B1 * | 3/2020 | Volpe | H04L 43/18 |
| 10,659,571 B1 * | 5/2020 | Volpe | H04L 43/50 |
| 2008/0165914 A1 * | 7/2008 | Horgan | H03K 21/38 |
| | | | 377/51 |

(Continued)

*Primary Examiner* — Parth Patel

(74) *Attorney, Agent, or Firm* — Holland & Hart LLP/Qualcomm

(57) ABSTRACT

Methods, systems, and devices for real time error recovery are described. The method may include a wireless device, such as a secondary wireless device, communicatively linked with another wireless device, such as a primary wireless device, and may include the wireless device identifying a first nonce value that is set based on a first packet counter value associated with a data packet stream between a source wireless device and the other wireless device, identifying a second nonce value that is set based on a second packet counter value associated with the data packet stream, receiving a first packet from the data packet stream, determining a sequence number for the first packet based on receiving the first packet, and decrypting the first packet using the first nonce value or the second nonce value based on the sequence number for the first packet.

20 Claims, 12 Drawing Sheets

(56) References Cited

U.S. PATENT DOCUMENTS

| | | | |
|---|---|---|---|
| 2009/0153290 A1* | 6/2009 | Bierach | H04L 9/32 340/5.6 |
| 2009/0228707 A1* | 9/2009 | Linsky | H04L 63/1466 713/171 |
| 2010/0008237 A1* | 1/2010 | Olgaard | H04L 43/50 370/249 |
| 2010/0246824 A1* | 9/2010 | Xiao | H04W 12/003 380/270 |
| 2010/0285750 A1* | 11/2010 | Simonelic | H04B 5/033 455/41.3 |
| 2011/0054907 A1* | 3/2011 | Chipchase | H04M 1/6066 704/275 |
| 2011/0153862 A1* | 6/2011 | Roosta | H04L 63/1441 709/234 |
| 2011/0250840 A1* | 10/2011 | Lee | H04M 1/7253 455/41.1 |
| 2012/0058727 A1* | 3/2012 | Cook | H04R 3/00 455/41.3 |
| 2013/0163573 A1* | 6/2013 | Oizumi | H04L 5/0007 370/336 |
| 2013/0316642 A1* | 11/2013 | Newham | H04W 52/0206 455/11.1 |
| 2014/0059662 A1* | 2/2014 | Zhu | H04L 9/0869 726/6 |
| 2014/0133656 A1* | 5/2014 | Wurster | H04W 12/08 380/270 |
| 2014/0160978 A1* | 6/2014 | Palin | H04W 8/005 370/254 |
| 2015/0163144 A1* | 6/2015 | Koponen | H04L 49/3009 370/237 |
| 2015/0201455 A1* | 7/2015 | Redding | H04W 4/80 455/41.2 |
| 2015/0215719 A1* | 7/2015 | Turgul | H04R 1/1091 381/58 |
| 2015/0312862 A1* | 10/2015 | Pei | H04B 1/385 455/574 |
| 2015/0319557 A1* | 11/2015 | El-Hoiydi | H04W 56/001 455/41.2 |
| 2016/0007104 A1* | 1/2016 | Chen | H04Q 11/0003 398/52 |
| 2016/0022167 A1* | 1/2016 | Simon | A61B 5/14542 600/301 |
| 2016/0148618 A1* | 5/2016 | Huang | G10L 19/005 381/2 |
| 2016/0191400 A1* | 6/2016 | Sreeramoju | H04L 47/34 370/474 |
| 2016/0212729 A1* | 7/2016 | Bulten | H04W 72/005 |
| 2016/0219358 A1* | 7/2016 | Shaffer | H04R 1/1041 |
| 2016/0234721 A1* | 8/2016 | Morioka | H04L 47/10 |
| 2016/0260301 A1* | 9/2016 | Miller | G06Q 10/087 |
| 2016/0294884 A1* | 10/2016 | Vincent | H04L 65/4084 |
| 2016/0381101 A1* | 12/2016 | Tse | H04L 65/604 709/219 |
| 2017/0006415 A1* | 1/2017 | Song | H04W 4/80 |
| 2017/0048631 A1* | 2/2017 | Kwon | H04R 25/652 |
| 2017/0111144 A1* | 4/2017 | Ma | H04L 1/1809 |
| 2017/0164089 A1* | 6/2017 | Lee | H04R 1/1025 |
| 2017/0264987 A1* | 9/2017 | Hong | H04R 1/1025 |
| 2017/0318614 A1* | 11/2017 | Wang | H04W 88/08 |
| 2018/0084456 A1* | 3/2018 | Gostev | H04L 69/14 |
| 2018/0139131 A1* | 5/2018 | Ignatchenko | H04L 69/16 |
| 2018/0199205 A1* | 7/2018 | Zhu | H04W 12/02 |
| 2018/0227658 A1* | 8/2018 | Hviid | H04R 1/1083 |
| 2018/0270197 A1* | 9/2018 | Subramanian | H04L 47/32 |
| 2018/0292522 A1* | 10/2018 | Cavendish | G01S 5/14 |
| 2018/0332009 A1* | 11/2018 | Lange | H04L 9/3242 |
| 2018/0338197 A1* | 11/2018 | Jeong | H04R 1/1033 |
| 2018/0359627 A1* | 12/2018 | Ko | H04L 67/303 |
| 2019/0007574 A1* | 1/2019 | Takarabe | H04W 48/16 |
| 2019/0020636 A1* | 1/2019 | Gehring | H04L 9/14 |
| 2019/0044576 A1* | 2/2019 | Thoen | H04W 4/80 |
| 2019/0044840 A1* | 2/2019 | Agrawal | H04L 43/045 |
| 2019/0044879 A1* | 2/2019 | Richardson | H04L 47/34 |
| 2019/0058675 A1* | 2/2019 | Schubert | H04L 49/552 |
| 2019/0086991 A1* | 3/2019 | Lee | H04W 52/0229 |
| 2019/0147711 A1* | 5/2019 | Grom | A63B 43/004 340/539.13 |
| 2019/0174557 A1* | 6/2019 | Ueda | H04W 52/0219 |
| 2019/0207835 A1* | 7/2019 | Lohiya | H04L 43/04 |
| 2019/0215695 A1* | 7/2019 | Yang | H04L 9/3271 |
| 2019/0230459 A1* | 7/2019 | Sridharan | G06F 3/16 |
| 2019/0281449 A1* | 9/2019 | Luo | H04L 63/029 |
| 2019/0327551 A1* | 10/2019 | Al-Amin | H04R 1/1041 |
| 2019/0349682 A1* | 11/2019 | Hsu | H04R 1/10 |
| 2019/0349754 A1* | 11/2019 | Larignon | H04L 9/3242 |
| 2019/0363842 A1* | 11/2019 | Fu | H04L 1/1671 |
| 2019/0385583 A1* | 12/2019 | Muggleton | G10K 11/17881 |
| 2020/0022198 A1* | 1/2020 | James | H04R 1/1041 |
| 2020/0053611 A1* | 2/2020 | Jorgovanovic | H04W 36/0027 |
| 2020/0053612 A1* | 2/2020 | Jorgovanovic | H04M 1/6066 |
| 2020/0059504 A1* | 2/2020 | Ho | H04L 65/80 |
| 2020/0068397 A1* | 2/2020 | Kang | H04W 56/0015 |
| 2020/0092631 A1* | 3/2020 | Degraye | G10K 11/17885 |
| 2020/0100307 A1* | 3/2020 | Sridhara | H04W 76/14 |
| 2020/0103513 A1* | 4/2020 | Knaappila | H04B 17/318 |
| 2020/0106552 A1* | 4/2020 | Paycher | H04W 76/14 |
| 2020/0107107 A1* | 4/2020 | Gong | H04W 4/80 |
| 2020/0107174 A1* | 4/2020 | Tong | H04W 76/10 |
| 2020/0107179 A1* | 4/2020 | Kyou | H04W 68/005 |
| 2020/0120727 A1* | 4/2020 | Batta | H04M 1/6066 |
| 2020/0137699 A1* | 4/2020 | Girardier | H04W 56/002 |
| 2020/0153567 A1* | 5/2020 | Agarwal | H04L 1/1867 |
| 2020/0162438 A1* | 5/2020 | Hassan | H04L 63/0435 |

* cited by examiner

REAL TIME MIC RECOVERY

BACKGROUND

The following relates generally to wireless communications, and more specifically to real time error recovery in a communication system.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

In some cases, wireless communications may be designed to provide enhanced quality of service. Improved techniques for wireless communications are desired.

SUMMARY

The described techniques relate to improved methods, systems, devices, and apparatuses that support real time error recovery. Generally, the described techniques provide for recovering from errors (e.g., message integrity check (MIC) errors, cyclic redundancy check (CRC) errors, etc.), and avoiding additional errors that may be caused by an initial error. For example, successful transmission (e.g., bidirectional transmission) of audio information for voice communications may have a relatively low tolerance for packet loss or timing issues. The link quality between two devices may affect the data rate used for communications (e.g., as poor link quality may be associated with reduced bitrates for more robust communications) and improved techniques for wireless communications and to provide enhanced quality of service are desired.

A method of real time packet decryption is described. The method may include identifying, by a secondary wireless device communicatively linked with a primary wireless device, a first nonce value that is set based on a first packet counter value associated with a data packet stream between a source wireless device and the primary wireless device, identifying, by the secondary wireless device, a second nonce value that is set based on a second packet counter value associated with the data packet stream, receiving, by the secondary wireless device, a first packet from the data packet stream, determining, by the secondary wireless device, a sequence number for the first packet based on receiving the first packet, and decrypting, by the secondary wireless device, the first packet using the first nonce value or the second nonce value based on the sequence number for the first packet.

An apparatus for real time packet decryption is described. The apparatus may include a processor, memory in electronic communication with the processor, and instructions stored in the memory. The instructions may be executable by the processor to cause the apparatus to identify, by a secondary wireless device communicatively linked with a primary wireless device, a first nonce value that is set based on a first packet counter value associated with a data packet stream between a source wireless device and the primary wireless device, identify, by the secondary wireless device, a second nonce value that is set based on a second packet counter value associated with the data packet stream, receive, by the secondary wireless device, a first packet from the data packet stream, determine, by the secondary wireless device, a sequence number for the first packet based on receiving the first packet, and decrypt, by the secondary wireless device, the first packet using the first nonce value or the second nonce value based on the sequence number for the first packet.

Another apparatus for real time packet decryption is described. The apparatus may include means for identifying, by a secondary wireless device communicatively linked with a primary wireless device, a first nonce value that is set based on a first packet counter value associated with a data packet stream between a source wireless device and the primary wireless device, identifying, by the secondary wireless device, a second nonce value that is set based on a second packet counter value associated with the data packet stream, receiving, by the secondary wireless device, a first packet from the data packet stream, determining, by the secondary wireless device, a sequence number for the first packet based on receiving the first packet, and decrypting, by the secondary wireless device, the first packet using the first nonce value or the second nonce value based on the sequence number for the first packet.

A non-transitory computer-readable medium storing code for real time packet decryption is described. The code may include instructions executable by a processor to identify, by a secondary wireless device communicatively linked with a primary wireless device, a first nonce value that is set based on a first packet counter value associated with a data packet stream between a source wireless device and the primary wireless device, identify, by the secondary wireless device, a second nonce value that is set based on a second packet counter value associated with the data packet stream, receive, by the secondary wireless device, a first packet from the data packet stream, determine, by the secondary wireless device, a sequence number for the first packet based on receiving the first packet, and decrypt, by the secondary wireless device, the first packet using the first nonce value or the second nonce value based on the sequence number for the first packet.

In some examples of the method, apparatuses, and non-transitory computer-readable medium described herein, decrypting the first packet may include operations, features, means, or instructions for using the first nonce value to decrypt the first packet or authenticate the first packet, or both, based on determining that the sequence number may be equal to a first value.

In some examples of the method, apparatuses, and non-transitory computer-readable medium described herein, decrypting the first packet may include operations, features, means, or instructions for using the second nonce value to decrypt the first packet or authenticate the first packet, or both, based on determining that the sequence number may be equal to a second value.

Some examples of the method, apparatuses, and non-transitory computer-readable medium described herein may further include operations, features, means, or instructions for detecting, by the secondary wireless device, a CRC error on the first packet based on receiving the first packet and determining whether the first packet may be received without error, and ignoring the first packet based on detecting the CRC error.

Some examples of the method, apparatuses, and non-transitory computer-readable medium described herein may further include operations, features, means, or instructions for receiving a second packet after receiving the first packet, and using the first nonce value to decrypt the second packet or authenticate the second packet, or both, when the determined sequence number includes an indication to use the second nonce value on the first packet.

Some examples of the method, apparatuses, and non-transitory computer-readable medium described herein may further include operations, features, means, or instructions for using the second nonce value to decrypt the second packet or authenticate the second packet, or both, when the determined sequence number includes an indication to use the first nonce value on the first packet.

Some examples of the method, apparatuses, and non-transitory computer-readable medium described herein may further include operations, features, means, or instructions for determining that the first packet counter value indicates a count of the first packet as a next packet, and determining that the second packet counter value indicates a count of a second packet as a packet after the next packet.

Some examples of the method, apparatuses, and non-transitory computer-readable medium described herein may further include operations, features, means, or instructions for establishing a first wireless link between the primary wireless device and the secondary wireless device based on powering on the primary wireless device or powering on the secondary wireless device, or both, and establishing a second wireless link between the primary wireless device and the source wireless device based on powering on the primary wireless device or powering on the source wireless device, or both. In some cases, the first wireless link between the primary wireless device and the secondary wireless device includes an encrypted piconet link. In some cases, the second wireless link between the primary wireless device and the source wireless device includes an encrypted piconet link.

Some examples of the method, apparatuses, and non-transitory computer-readable medium described herein may further include operations, features, means, or instructions for receiving the first packet over one or more time slots based on a size of a payload sent via the first packet, and receiving a second packet over one or more time slots based on a size of a payload sent via the second packet.

DETAILED DESCRIPTION

Figure 1:
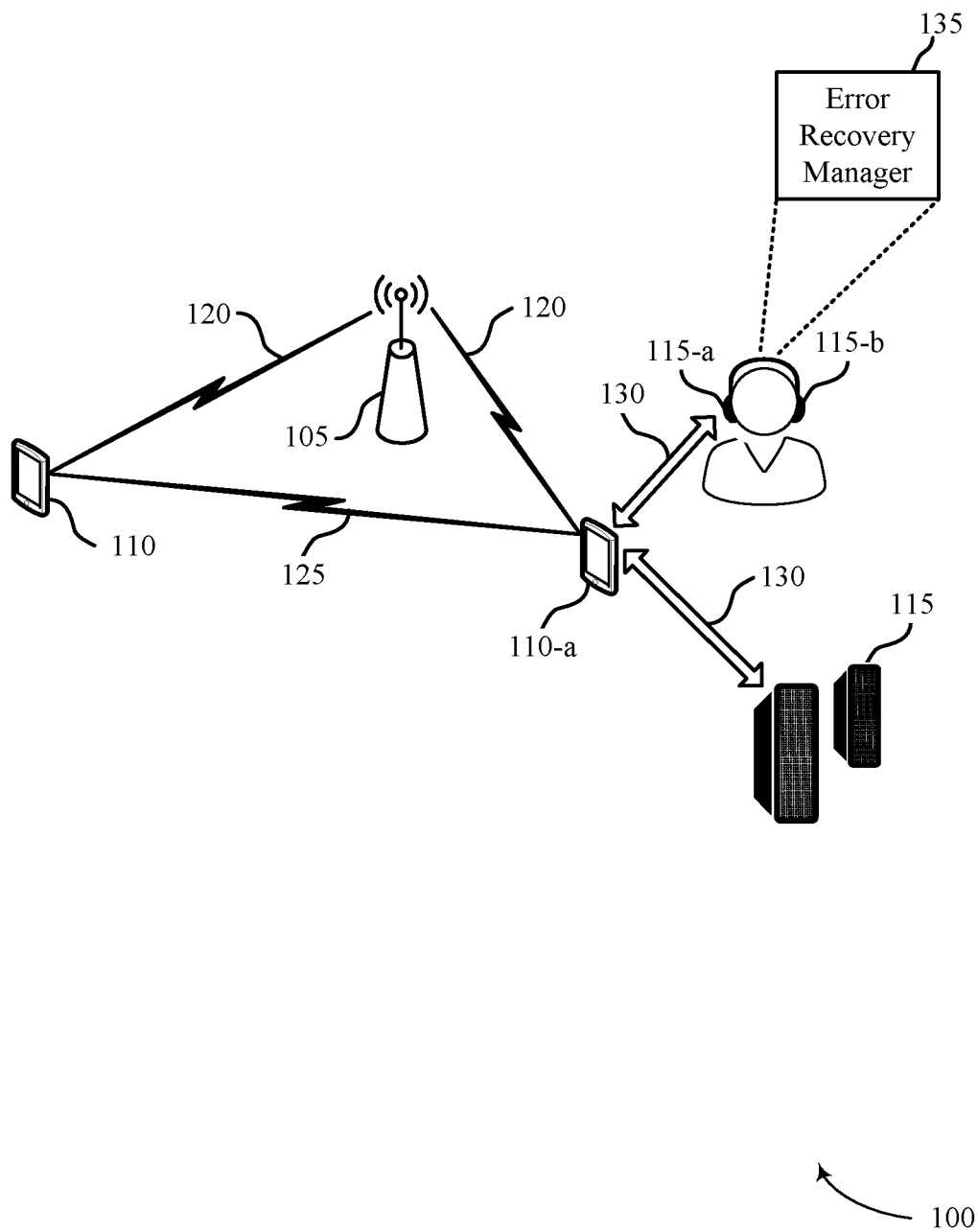
FIG. 1 illustrates an example of a system for real time error recovery that supports real time MIC recovery in accordance with aspects of the present disclosure.

In some cases, a wireless device, such as a phone, may be configured to transmit Bluetooth advanced audio distribution profile (A2DP) packets to a first wireless device, such as one earbud (e.g., primary earbud), while a second wireless device, such as an associated earbud (e.g., secondary earbud), sniffs the traffic from the wireless device and the first wireless device. But some systems and techniques that use more passive listening (e.g., by a second wireless device) may have shortcomings, including that a packet received by the sniffing second wireless device (e.g., secondary earbud) may not correspond to the same packet counter for which the second wireless device has set the nonce for decryption. In some cases, the sniffing second wireless device (e.g., secondary earbud) may receive message integrity check (MIC) errors relatively frequently. In some cases, one MIC error caused by using a wrong packet counter to decrypt a packet from a particular sequence of packets may cause the MIC to fail for packets from subsequent sequences.

The present techniques relate to a recovery mechanism when a sniffing second wireless device loses sync and later sniffs a packet from another device, such as the phone, which normally would not match the expected MIC due to packet numbering mismatch. The method allows the second wireless device to use the next expected packet number and recalculate the MIC allowing recovery of data and synchronization. The present techniques include a mechanism to avoid MIC errors for the many scenarios, including, but not limited to packet loss due to cyclic redundancy check (CRC) error or the sniffing secondary earbud not hearing or detecting a packet (e.g., detecting a CRC in a first sequence and then not detecting a packet from a second sequence immediately after the first sequence, etc.). With the present techniques, a device may set a first nonce and a second nonce (e.g. first nonce N1 and second nonce N2) for a reception on a sniffing encrypted link between the second wireless device (e.g., a secondary earbud) and another wireless device (e.g., a primary earbud).

In one example, N1 may correspond to the packet counter C=x (packet count of next expected packet), while N2 may correspond to the packet counter C=x+1 (packet count immediately after packet count of next expected packet). Where S may be the next expected sequence number (SEQN) corresponding to packet counter C=x, then S' may be the sequence corresponding to the packet counter C=x+1. In one example, the secondary earbud may be configured to decrypt a packet using nonce N1 when the sequence number of the received packet is S (or based on how the sequence number relates to a value S), and use nonce N2 when the sequence number of the received packet is S' (or based on how the sequence number relates to a value S').

Although the present disclosure describes a secondary wireless device recovering from or preventing certain communication errors (e.g., CRC errors, MIC errors, etc.), it is understood that the operations described may be performed by any wireless device, including, but not limited to, a primary wireless device or a secondary wireless device, or both. For example, a secondary wireless device that sniffs packets sent on a link established between a primary wireless device and a source device may use the techniques described herein to recover from or prevent certain communication errors. Additionally or alternatively, the primary wireless device may use the techniques described herein to recover from or prevent certain communication errors.

Aspects of the disclosure are initially described in the context of a wireless communications system. Aspects of the disclosure are further illustrated by and described with reference to a wireless communications systems. Aspects of the disclosure are further illustrated by and described with reference to apparatus diagrams, system diagrams, and flowcharts that relate to real time MIC recovery.

FIG. 1 illustrates a wireless communications system 100 (e.g., which may include to refer to or include a wireless personal area network (PAN), a wireless local area network (WLAN), a Wi-Fi network) configured in accordance with various aspects of the present disclosure. The wireless communications system 100 may include an AP 105, devices 110, and devices 115 (e.g., paired devices) implementing WLAN communications (e.g., Wi-Fi communications) and/or Bluetooth communications. For example, devices 110 may include cell phones, mobile stations, personal digital assistant (PDAs), other handheld devices, netbooks, notebook computers, tablet computers, laptops, or some other suitable terminology. Devices 115 may include Bluetooth devices capable of pairing with other Bluetooth devices (e.g., such as devices 110), which may include wireless headsets, speakers, ear pieces, headphones, display devices (e.g., TVs, computer monitors), microphones, meters, valves, etc.

Bluetooth communications may refer to a short-range communication protocol and may be used to connect and exchange information between devices 110 and devices 115 (e.g., between mobile phones, computers, digital cameras, wireless headsets, speakers, keyboards, mice or other input peripherals, and similar devices). Bluetooth systems (e.g., aspects of wireless communications system 100) may be organized using a master-slave relationship employing a time division duplex protocol having, for example, defined time slots of 625 mu secs, in which transmission alternates between the master device (e.g., a device 110) and one or more slave devices (e.g., devices 115). In some cases, a device 110 may generally refer to a master device, and a device 115 may refer to a slave device in a PAN. As such, in some cases, a device may be referred to as either a device 110 or a device 115 based on the Bluetooth role configuration of the device. That is, designation of a device as either a device 110 or a device 115 may not necessarily indicate a distinction in device capability, but rather may refer to or indicate roles held by the device in the PAN. Generally, device 110 may refer to a wireless communication device capable of wirelessly exchanging data signals with another device, and device 115 may refer to a device operating in a slave role, or to a short-range wireless device capable of exchanging data signals with the mobile device (e.g., using Bluetooth communication protocols).

A Bluetooth device may be compatible with certain Bluetooth profiles to use desired services. A Bluetooth profile may refer to a specification regarding an aspect of Bluetooth-based wireless communications between devices. That is, a profile specification may refer to a set of instructions for using the Bluetooth protocol stack in a certain way, and may include information such as suggested user interface formats, particular options and parameters at each layer of the Bluetooth protocol stack, etc. For example, a Bluetooth specification may include various profiles that define the behavior associated with each communication endpoint to implement a specific use case. Profiles may thus generally be defined according to a protocol stack that promotes and allows interoperability between endpoint devices from different manufacturers through enabling applications to discover and use services that other nearby Bluetooth devices may be offering. The Bluetooth specification defines device role pairs that together form a single use case called a profile. One example profile defined in the Bluetooth specification is the Handsfree Profile (HFP) for voice telephony, in which one device implements an Audio Gateway (AG) role and the other device implements a Handsfree (HF) device role. Another example is the Advanced Audio Distribution Profile (A2DP) for high-quality audio streaming, in which one device (e.g., device 110-*a*) implements an audio source device (SRC) role and another device (e.g., device 115-*a* and/or device 115-*b*) implements an audio sink device (SNK) role.

For a commercial Bluetooth device that implements one role in a profile to function properly, another device that implements the corresponding role may be present within the radio range of the first device. For example, in order for an HF device such as a Bluetooth headset to function according to the Handsfree Profile, a device implementing the AG role (e.g., a cell phone) may be present within radio range. Likewise, in order to stream high-quality mono or stereo audio according to the A2DP, a device implementing the SNK role (e.g., Bluetooth headphones or Bluetooth speakers) may be within radio range of a device implementing the SRC role (e.g., a stereo music player).

The Bluetooth specification defines a layered data transport architecture and various protocols and procedures to handle data communicated between two devices that implement a particular profile use case. For example, various logical links are available to support different application data transport conditions, with each logical link associated with a logical transport having certain characteristics (e.g., flow control, acknowledgement/repeat mechanisms, sequence numbering, scheduling behavior, etc.). The Bluetooth protocol stack is split in two parts: a "controller stack" containing the timing critical radio interface, and a "host stack" dealing with high level data. The controller stack is generally implemented in a low cost silicon device containing the Bluetooth radio and a microprocessor. The controller stack may be responsible for setting up links (e.g., link 130) such as asynchronous connection-less (ACL) links, synchronous connection orientated (SCO) links, etc.

Further, the controller stack may implement link management protocol (LMP) functions, low energy link layer (LE LL) functions, etc. The host stack is generally implemented as part of an operating system, or as an installable package on top of an operating system. The host stack may be responsible for logical link control and adaptation protocol (L2CAP) functions, Bluetooth network encapsulation protocol (BNEP) functions, service discovery protocol (SDP) functions, etc. In some cases, the controller stack and the host stack may communicate via a host controller interface (HCI). In other cases, (e.g., for integrated devices such as Bluetooth headsets), the host stack and controller stack may be run on the same microprocessor to reduce mass production costs. For such "hostless systems," the HCI may be optional, and may be implemented as an internal software interface.

A link 130 established between two Bluetooth devices (e.g., between device 110-a and device 115-a, and/or between 110-a and device 115-b) may provide for communications or services (e.g., according to some Bluetooth profile). For example, a Bluetooth connection may be an extended synchronous connection orientated (eSCO) link for voice call (e.g., which may allow for retransmission), an ACL link for music streaming (e.g., A2DP), etc. For example, eSCO packets may be transmitted in predetermined time slots (e.g., 6 Bluetooth slots each for eSCO). The regular interval between the eSCO packets may be specified when the Bluetooth link is established. The eSCO packets to/from a specific slave device (e.g., device 115-a and/or device 115-b) are acknowledged, and may be retransmitted if not acknowledged during a retransmission window. In addition, audio may be streamed between the device 110-a and device 115-a using an ACL link (A2DP profile), and/or between device 110-a and device 115-b using the same ACL link or an additional ACL link. In some cases, the ACL link may occupy 1, 3, or 5 Bluetooth slots for data or voice. Other Bluetooth profiles supported by Bluetooth devices may include Bluetooth Low Energy (BLE) (e.g., providing considerably reduced power consumption and cost while maintaining a similar communication range), human interface device profile (HID) (e.g., providing low latency links with low power conditions), etc.

In some cases, a device may be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some cases, Bluetooth and WLAN communications may share a same medium, such as the same unlicensed frequency medium. In such cases, a device 110 may support WLAN communications via AP 105 (e.g., over communication links 120). The AP 105 and the associated devices 110 may represent a basic service set (BSS) or an extended service set (ESS). The various devices 110 in the network may be able to communicate with one another through the AP 105. In some cases the AP 105 may be associated with a coverage area, which may represent a basic service area (BSA).

Devices 110 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within wireless communications system 100. AP 105 may be coupled to a network, such as the Internet, and may enable a device 110 to communicate via the network (or communicate with other devices 110 coupled to the AP 105). A device 110 may communicate with a network device bi-directionally. For example, in a WLAN, a device 110 may communicate with an associated AP 105 via downlink (e.g., the communication link from the AP 105 to the device 110) and uplink (e.g., the communication link from the device 110 to the AP 105).

In some examples, content, media, audio, etc. exchanged between a device 110 and a device 115 may originate from a WLAN. For example, in some cases, device 110-a may receive audio from an AP 105 (e.g., via WLAN communications), and the device 110-a may then implement the described techniques to relay or pass the audio to the device 115-a and/or device 115-b (e.g., via Bluetooth communications). In some cases, certain types of Bluetooth communications (e.g., such as high quality or high definition (HD) Bluetooth) may rely on an enhanced quality of service. For example, in some cases, delay-sensitive Bluetooth traffic may have higher priority than WLAN traffic.

As shown, device 115-a and/or device 115-b may include an error recovery manager 135. In some cases, recovery manager 135 may be configured to prevent and/or recover from MIC errors based on communications between device 110-a and device 115-a and/or device 115-b. In some cases, device 110-a may establish link 130 with device 115-a, while device 115-a may establish a separate link with device 115-b. In some cases, device 110-a may send packets to device 115-a over link 130. In some cases, device 110-a may send encrypted packets to device 115-a over link 130. For example, device 110-a may encrypt payload load and send the encrypted payload data as an encrypted packet to device 115-a over link 130. In some examples, device 115-b may sniff link 130 and capture packets device 110-a sends device 115-a over link 130. For example, device 115-b may sniff packets between device 110-a and device 115-a by monitoring link 130 and capturing packets of data sent by device 110-a to device 115-a over the monitored link 130.

In one example, source device 110-a may send a first data packet to device 115-a over link 130. In some cases, device 115-b may sniff link 130 and capture the first data packet based on the sniffing (e.g., device 115-b capturing packets source device 110-a sends to device 115-a). In some cases, device 115-b may set a first nonce relative to or equal to a first packet counter value associated with the first data packet. In some cases, device 115-b may set a second nonce relative to or equal to a second packet counter value associated with a second data packet sent by device 110-a to device 115-a. In some cases, after capturing the first data packet, device 115-b may analyze the first data packet and determine a sequence number for the first packet based on the analysis. In some cases, device 115-b may attempt to decrypt the first data packet based on the determined sequence number.

In some examples, device 115-b may detect a mismatch between the first data packet and the first nonce. In some cases, after detecting the mismatch between the first data packet and the first nonce, device 115-b may attempt to decrypt the first data packet using the second nonce. Alternatively, device 115-b may wait until the next data packet (e.g., second data packet) and attempt to decrypt the next data packet using the first nonce and/or the second nonce. In some cases, device 115-b may update the first nonce and/or the second nonce and attempt to decrypt the next data packet using the updated first nonce and/or the updated second nonce.

The present techniques enable wireless communications system 100 to recover from certain communication errors (e.g., MIC errors, CRC errors, etc.) in real time, resulting in an improvement in the overall latency of associated data traffic (e.g., A2DP traffic, etc.), among other benefits.

Figure 2:
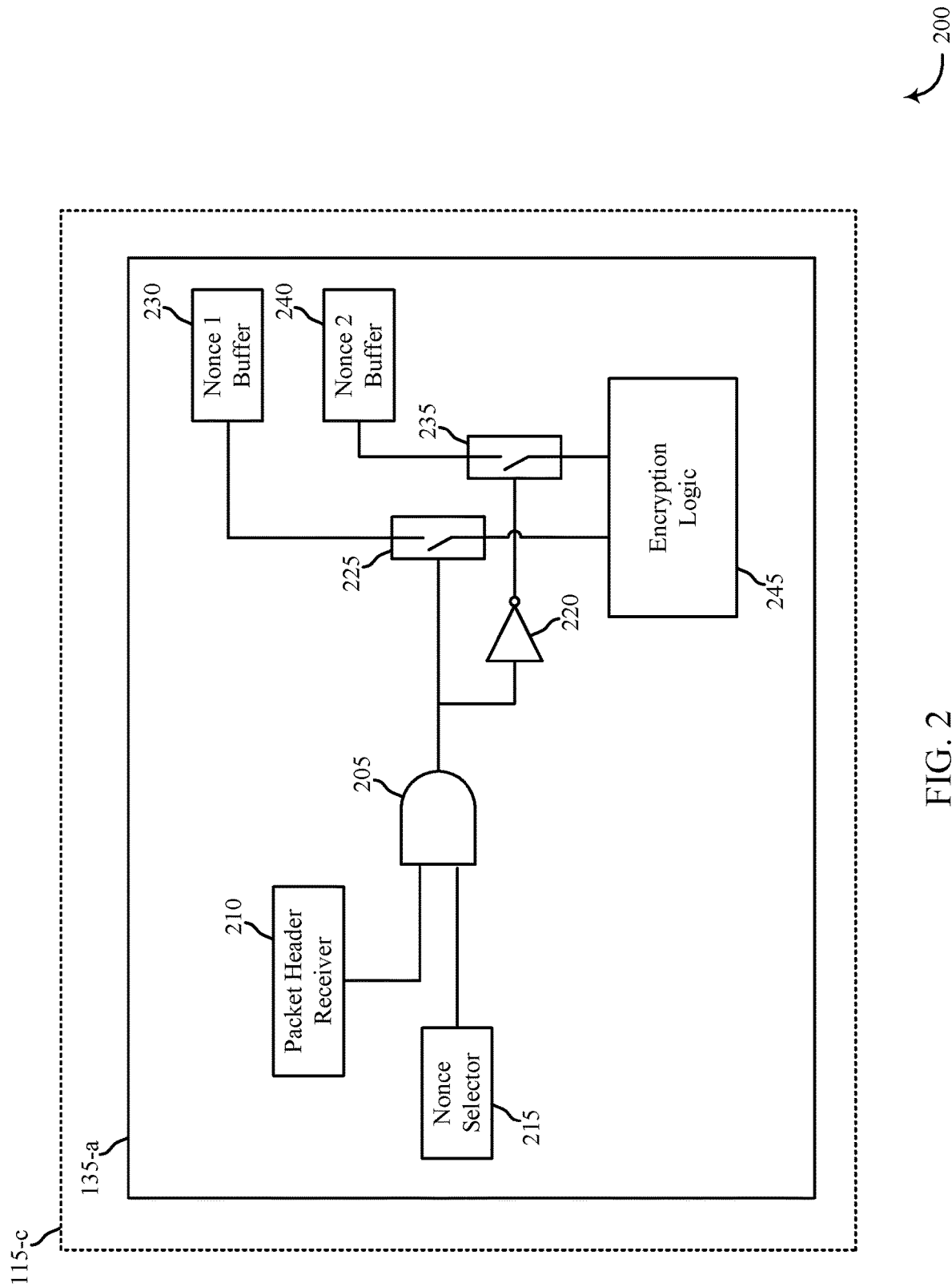
FIG. 2 illustrates an example of a wireless communication system that supports real time packet decryption in accordance with aspects of the present disclosure.

FIG. 2 illustrates an example of a wireless communications system 200 that supports real time MIC recovery in accordance with aspects of the present disclosure. In some examples, wireless communications system 200 may implement aspects of or related to wireless communications system 100.

As illustrated, system 200 includes device 115-c. The device 115-c may be an example of any one of devices 115 from FIG. 1. In one example, device 115-c may be a wireless audio device (e.g., wireless ear bud, wireless headphone, wireless speaker, etc.). As shown, device 115-c may include error recovery manager 135-a, which may be an example of error recovery manager 135 of FIG. 1.

In one example, error recovery manager 135-a may include at least one of software, firmware, or hardware, or any combination thereof. Moreover, although one way of implementing device 115-c is shown, other similar implementations are specifically contemplated as would be appreciate by a person of ordinary skill in the art. As shown, error recovery manager 135-a may include logic gate 205 (e.g., AND gate, OR gate, NOR gate, NAND gate, XOR gate, etc.). As shown, logic gate 205 may receive inputs from packet header receiver 210 and nonce selector 215. In some examples logic gate 205 may send an output to inverter 220 and first switch 225. In some cases, inverter 220 may perform an operation on the data based on the data and/or other factors (e.g., may logically invert the output from logic gate 205). For example, when the output from logic gate 205 is 0, then the output of inverter 220 may be 1, or when the output from logic gate 205 is 1, then the output of inverter 220 may be 0.

As shown, an output from inverter 220 may be provided to second switch 235. In the illustrated example, logic gate 205 may close first switch 225 when the output of logic gate 205 is a logical 1. When the output of logic gate 205 is a logical 1, the output of inverter 220 may be logical 0, which may open second switch 235. Alternatively, logic gate 205 may open first switch 225 when the output of logic gate 205 is a logical 0. When the output of logic gate 205 is a logical 0, the output of inverter 220 may be logical 1, which may close second switch 235. Thus, when first switch 225 is closed, second switch 235 may be opened; and when first switch 225 is opened, second switch 235 may be closed. In some cases, first nonce 1 buffer 230 may store or provide a first nonce value N1, while second nonce 2 buffer 240 may store or provide a second nonce value N2. In some examples, closing first switch 225 may result in error recovery manager 135-a selecting the first nonce value N1 from first nonce 1 buffer 230 for the nonce to use in decrypting an incoming packet or a captured packet. Alternatively, closing second switch 235 may result in error recovery manager 135-a selecting the second nonce value N2 from second nonce 2 buffer 240 for the nonce to use in decrypting an incoming packet or a captured packet.

In one example, packet header receiver 210 may receive one or more packet headers. For example, when device 115-c is a primary device, packet header receiver 210 may receive a packet header from an incoming packet sent by source device (e.g., device 110-a of FIG. 1) to device 115-c via a link established between device 115-c and the source device. Alternatively, when device 115-c is a secondary device, packet header receiver 210 may receive a packet header from a packet the source device sends a primary device via device 115-c sniffing the link established between device 115-c and the source device and device 115-c capturing the packet based on the sniffing. In some cases, the packet header may include a sequence number (e.g., next expected sequence number (SEQN-1) corresponding to packet counter C=x, or next expected sequence number (SEQN-2) corresponding to packet counter C=x+1, etc.). In some cases, the sequence number in the packet header may be either zero or one (e.g., 0 or 1). When packet header receiver 210 receives a packet header with a sequence number of 0, then packet header receiver 210 may output a logical 0, and when packet header receiver 210 receives a packet header with a sequence number of 1, then packet header receiver 210 may output a logical 1.

In one example, nonce selector 215 may enable or disable selection of the nonce for an incoming packet or captured packet. For example, nonce selector 215 may enable or disable a nonce selection bit. In some cases, error recovery manager 135-a may enable nonce selection (e.g., nonce selector 215 outputs a logical 1 when nonce selection is enabled) when device 115-c is a secondary device configured to sniff packets sent on a link between a source device and a primary device. Alternatively, error recovery manager 135-a may disable nonce selection (e.g., nonce selector 215 outputs a logical 0 when nonce selection is disabled) when device 115-c is a primary device configured to received packets on a link established between a source device and device 115-c.

When device 115-c is a secondary device, error recovery manager 135-a may cause nonce selector 215 to enable nonce selection, resulting in nonce selector 215 to output a logical 1. And when packet header receiver 210 receives a packet header with a sequence number of 1, as merely one example, packet header receiver 210 outputs a logical 1. Thus, with logic gate 205 as an AND gate and packet header receiver 210 providing a logical 1 as a first input to logic gate 205 and nonce selector 215 providing a logical 1 as a second input, the output of logic gate 205 is a logical 1. Accordingly, when the output of logic gate 205 is a logical 1, then first switch 225 is closed, while second switch 235 remains open since inverter 220 inverts the logical 1 output from logic gate 205 to a logical 0 and outputs the logical 0 to second switch 235. As a result, error recovery manager 135-a selects the first nonce value N1 from nonce 1 buffer 230 as the nonce to use to decrypt a captured packet.

On the other hand, when packet header receiver 210 receives a packet header with a sequence number of 0, then packet header receiver 210 outputs a logical 0. With logic gate 205 as an AND gate and packet header receiver 210 providing a logical 0 as a first input to logic gate 205 and nonce selector 215 providing a logical 1 as a second input, then the output of logic gate 205 would be a logical 0. Accordingly, when the output of logic gate 205 is a logical 0, then first switch 225 is open, while second switch 235 is closed since inverter 220 inverts the logical 0 output from logic gate 205 to a logical 1 and outputs the logical 1 to second switch 235. As a result, error recovery manager 135-a selects the second nonce value N2 from nonce 2 buffer 240 as the nonce to use to decrypt a captured packet.

When device 115-c is a primary device, error recovery manager 135-a may cause nonce selector 215 to disable nonce selection, resulting in nonce selector 215 to output a logical 0. Accordingly, when packet header receiver 210 receives a packet header with a sequence number of 1, packet header receiver 210 outputs a logical 1. Thus, with logic gate 205 as an AND gate and packet header receiver 210 providing a logical 1 as a first input to logic gate 205 and nonce selector 215 providing a logical 0 as a second input, the output of logic gate 205 is a logical 0. Accordingly, when the output of logic gate 205 is a logical 0, then first switch 225 is open, while second switch 235 is closed since inverter 220 inverts the logical 0 output from logic gate 205 to a logical 1 and outputs the logical 1 to second switch 235.

As a result, error recovery manager 135-a selects the second nonce value N2 from nonce 2 buffer 240 as the nonce to use to decrypt a captured packet. Conversely, when packet header receiver 210 receives a packet header with a sequence number of 0, then packet header receiver 210 outputs a logical 0. With logic gate 205 as an AND gate and packet header receiver 210 providing a logical 0 as a first input to logic gate 205 and nonce selector 215 providing a logical 0 as a second input, then the output of logic gate 205 would be a logical 0. Thus, again inverter 220 inverts the logical 0 output from logic gate 205 to a logical 1 and outputs the logical 1 to second switch 235, resulting in error recovery manager 135-a selecting the second nonce value N2 from nonce 2 buffer 240 as the nonce to use to decrypt a captured packet. Thus, when device 115-c is a primary device and as a result nonce selection bit is set to logical 0, error recovery manager 135-a may select the second nonce value N2 from second nonce 2 buffer 240 for the nonce to use in decrypting an incoming packet. The wireless communications system 200 may include hardware components and logic to enable a secondary device (e.g., device 115-c) that is configured to sniff packets sent by a source device (e.g., source devices 110 of FIG. 1) to a primary device (e.g., device 115-a of FIG. 1) and recover from communication errors in real time (e.g., MIC errors, CRC errors, etc.) caused by a mismatch between a packet counter and a captured packet.

Figure 3:
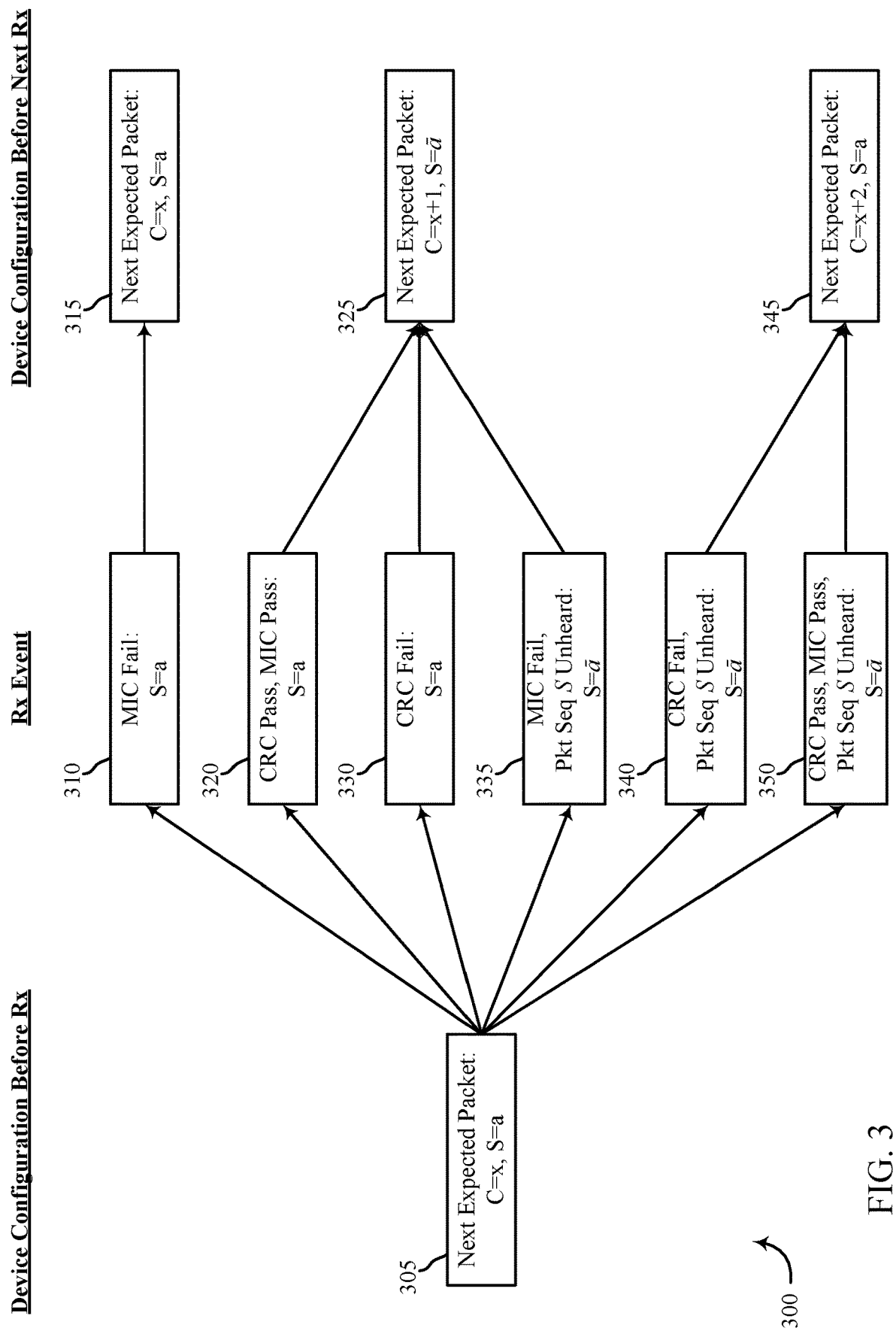
FIG. 3 illustrates an example of a configuration flowchart of a wireless communication system that supports real time packet decryption in accordance with aspects of the present disclosure.

FIG. 3 illustrates an example of a configuration flowchart 300 related to a wireless communications system that supports real time MIC recovery in accordance with aspects of the present disclosure. In some examples, configuration flowchart 300 related to a wireless communications system may implement aspects of wireless communications system 100.

As illustrated, configuration flowchart 300 includes multiple configuration options of a device (e.g., device 115 of FIGS. 1 and/or 2) at various stages associated with the device receiving information, such as a packet. For example, configuration flowchart 300 includes device configuration options before the device receives a packet, device configuration options while the device receives the packet, and device configuration options after the device received a packet before the device receives a next packet. In some cases, the device may receive packets on an encrypted link (e.g., link 130 of FIG. 1). In some cases, the device sniffs packets sent over the encrypted link. Although configuration flowchart 300 may described in relation to a secondary wireless device in sniffing mode, at least some if not all of the described configurations may apply to another wireless device, such as a primary wireless device.

In one example, a device may identify a packet counter C for a next packet. In some cases, the device may set a nonce value for the next packet based at least in part on the packet counter (e.g., C=x) and use the nonce to decrypt the packet. In some cases, the device may perform a message integrity check (MIC) on the decrypted packet. In some cases, the device may identify a packet counter for a next packet as well as third, later packet after next packet (e.g., a packet expected directly after the next packet).

In some cases, the device may identify S=a as the sequence number corresponding to the packet counter C=x for the next packet, and may identify S=$\bar{a}$ as the sequence number corresponding to the packet counter C=x+1 for the after next packet (e.g., $\bar{a}$=1 when a=1, and $\bar{a}$=0 when a=1). In some cases, the device may set a first nonce value for the next packet based at least in part on the packet counter (e.g., C=x) and use the first nonce to decrypt the next packet, and may set a second nonce value for the after next packet based at least in part on the packet counter (e.g., C=x+1) and use the second nonce to decrypt the after next packet.

Accordingly, when the device is in sniffing mode the device may decrypt a packet using a first nonce N1 when the sequence number is S=a, and may decrypt a packet using a second nonce N2 when the sequence number is S=$\bar{a}$. In some examples, when the expected packer counter of a next packet is C=x and the expected sequence of the next packet is S=0, then the device may use nonce N1 to decrypt a packet with packet counter C=x+1, and may use nonce N2 to decrypt a packet with packet counter C=x. In some examples, when the expected packet counter of a next packet is C=x and the expected sequence of the next packet is S=1, then the device may use nonce N1 to decrypt a packet with a packet counter C=x, and may use nonce N2 to decrypt a packet with a packet counter C=x+1.

As illustrated, at 305, before receiving a next packet (e.g., a first packet in a stream of packets, or a next packet after a previous packet, etc.), a device may be configured to expect a packer counter of the next packet to be C=x and to expect a sequence of the next packet to be S=a. At the time the packet is received (e.g., just as the packet is received, just after receiving the packet, just after decrypting the packet, just after performing an error check on the packet, etc.) the device may update its configuration based on information identified from the packet and/or information identified from analyzing the packet.

At 310, the device may receive the next packet (e.g., the received packet), and attempt to perform MIC on the received packet. As shown, the device may determine that an MIC error is associated with the received packet (e.g., nonce fails to decrypt the packet, etc.). In some cases, the determined MIC error may be a genuine MIC error or may be determined based at least in part on the device failing to hear 2, 4, 6, 8, or more even number of packets in a row. In any case, the device identifies the MIC error as a genuine MIC error. As shown, the device may expect the sequence of the received packet with the MIC error to be S=a when the received packet is the expected next packet after 305 and no packets were unheard by the device. At 315, based on the MIC error identified at 310 the device may expect the packet counter of the after next packet (e.g., the packet after the packet received at 310) to be C=x and the sequence of this after next packet to be S=a.

Alternatively, at 320 the device may receive the next packet (e.g., the received packet), decrypt the packet, and perform MIC on the decrypted packet. Additionally or alternatively, the device may perform cyclic redundancy check (CRC) on the decrypted packet. At 320, the device may determine that both CRC and MIC pass, indicating the received packet has no CRC error or MIC error. As shown, the device may expect the sequence of the received packet to be S=a when the received packet is the expected next packet after 305 and no packets were unheard by the device (e.g., the packet counter of the received packet matches the expected packet counter, the sequence number of the received packet matches the expected sequence number, and the device is able to decrypt the received packet using the nonce that is set based on the expected packet counter). Based on the CRC and MIC passing and the device correctly decrypting the received packet with the set nonce, at 325 the device may expect the packet counter of the after next packet (e.g., the packet after the packet received at 320) to be C=x+1 and the sequence of this after next packet to be S=$\bar{a}$.

Alternatively, at 330 the device may receive the next packet (e.g., the received packet), and determine that a CRC error is associated with the received packet. As shown, the device may expect the sequence of the received packet to be S=a when the received packet is the expected next packet after 305 and no packets were unheard by the device. Based on the CRC error at 330, at 325 the device may expect the packet counter of the after next packet (e.g., the packet after the packet received at 330) to be C=x+1 and the sequence of this after next packet to be S=$\bar{a}$.

Alternatively, at 335 the device may fail to receive the next packet expected to be received after 305. For example, the device may determine that a sequence number associated with a received packet does not match the expected sequence number (e.g., S=a). Additionally or alternatively, the device may determine that a packet counter associated with a received packet does not match the expected packet counter of the next expected packet (e.g., C=x). Accordingly, at 335 the device may determine that the next packet expected to be received after 305 was not received and as a result may update the expected sequence number to be S=$\bar{a}$. However, the device may detect an MIC error based on a failed attempt to decrypt the packet based on the updated sequence number and/or an updated packet counter. Again, the determined MIC error may be a genuine MIC error or may be determined based at least in part on the device failing to hear a quantity (e.g., 2, 4, 6, 8, or more) of packets in a row. Based on the MIC error at 335, at 325 the device may expect the packet counter of the after next packet (e.g., the packet after the packet received at 335) to be C=x+1 and the sequence of this after next packet to be S=$\bar{a}$.

Alternatively, at 340 the device may fail to receive the next packet expected to be received after 305. Accordingly, at 340 the device may determine that the next packet expected to be received after 305 was not received and as a result may update the expected sequence number to be S=$\bar{a}$. However, the device may detect a CRC error based on the determination that the next packet expected to be received after 305 was not received. Based on the CRC error at 340, at 345 the device may expect the packet counter of the after next packet (e.g., the packet after the packet received at 340) to be C=x+2 and the sequence of this after next packet to be S=a.

Alternatively, at 350 the device may fail to receive the next packet expected to be received after 305. Accordingly, at 350 the device may determine that the next packet expected to be received after 305 was not received and as a result may update the expected sequence number to be S=$\bar{a}$. As shown, the device may determine that both CRC and MIC pass, indicating the received packet has no CRC error or MIC error. For example, after determining the next expected packet after 305 was unheard, the device may update the expected sequence number to be s=$\bar{a}$.

After receiving a packet (e.g., the packet after the next expected packet that wasn't heard), the device may determine that the sequence number of the received packet matches the expected sequence number S=$\bar{a}$. As a result, the device may attempt to decrypt the received packet using a nonce selected based at least in part on the expected sequence number S=$\bar{a}$ and/or an expected packet counter (e.g., C=x+1), and successfully decrypt the packet. Accordingly, based on both CRC and MIC passing at 350, at 345 the device may expect the packet counter of the next packet (e.g., the packet after the packet received at 350) to be C=x+2 and the sequence of this after next packet to be S=a. The present techniques enable, among other benefits, a secondary device (e.g., device 115-b or device 115-c) that is sniffing packets sent by a source device (e.g., device 110) to a primary device (e.g., device 115-a) to correct communication errors (e.g., MIC errors, CRC errors, etc.) by, for example, correcting a packet counter in real time to avoid further communication errors that would result from using a mismatching packet counter to decrypt a captured packet.

Figure 4:
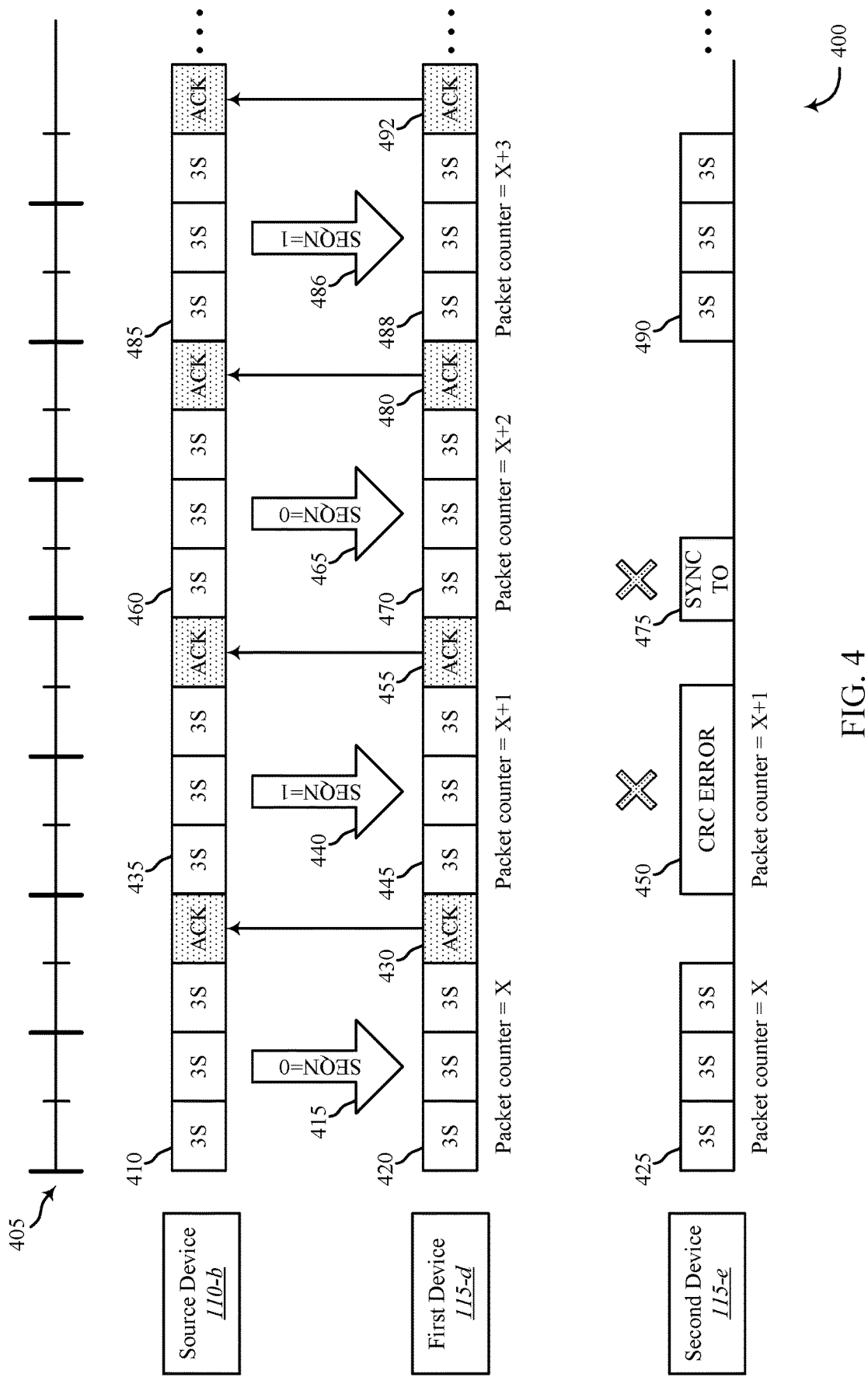
FIG. 4 illustrates an example of a wireless communication system that supports real time packet decryption in accordance with aspects of the present disclosure.

FIG. 4 illustrates an example of a wireless communication system 400 that supports real time MIC recovery in accordance with aspects of the present disclosure. In some examples, wireless communication system 400 may implement aspects of wireless communications system 100.

As illustrated, system 400 may include source device 110-b, first device 115-d, and second device 115-e. The illustrated source device 110-b may be an example of any one of devices 110 from FIG. 1. Similarly, first device 115-d and/or second device 115-e may be examples of any one of devices 115 from FIGS. 1 and/or 2.

In the illustrated example, piconet 405 may be established between source device 110-b and first device 115-d. In some cases, second device 115-e may be configured to sniff packets sent (by source device 110-b to first device 115-d) over piconet 405. In some cases, first device 115-d may establish a second piconet with second device 115-e that is different and separate from piconet 405.

At 410, source device 110-b may send a packet (e.g., a 3-slot packet as shown taking 3 slots to transmit) to first device 115-d. Although 3-slot packets are shown, it is understood that source device 110-b may send any combination of 1-slot packets, 3-slot packets, and 5-slot packets to first device 115-d over piconet 405. As shown, the packet at 410 may be associated with a particular sequence number 415 (e.g., SEQN=0 as shown). In some cases, the packet sent at 410 may be encrypted (e.g., by source device 110-b). In some cases, the encryption of the packet sent at 410 may be based at least in part on a packet counter of the packet.

At 420, first device 115-d may receive the packet sent by source device 110-b at 410. As shown, first device 115-d may expect the next packet from source device 110-b (e.g., the packet sent at 410) to have a sequence number of zero (e.g., SEQN=0) and packet counter of C=x.

At 425, second device 115-e may sniff piconet 405 and as a result may capture the packet source device 110-b sends at 410 to first device 115-d. In some cases, before capturing the packet at 425 second device 115-e may also expect the next packet from source device 110-b (e.g., the packet sent at 410) to have a sequence number of zero (e.g., SEQN=0) and packet counter of C=x. Accordingly, second device 115-e may be enabled to decrypt and/or authenticate the packet captured at 425 based at least in part on the expected sequence number (e.g., SEQN=0) matching the actual sequence number 415 and/or the expected packet counter (e.g., C=x) matching the actual packet counter of the packet received at 425.

Based on the successful decryption/authentication of the packet captured at 425, second device 115-e may set the expected packet counter of the next packet to C=x+1 and the expected sequence number of the next packet to SEQN=1. Accordingly, second device 115-e may set a first nonce value N1 based on the next expected packet counter C=x+1 corresponding to the next expected sequence number SEQN=1, and set a second nonce value N2 based on the after next expected packet counter C=x+2 corresponding to the after next expected sequence number SEQN=0. Thus, if a packet associated with either a packet value of C=x+1 or C=x+2 arrives next, second device 115-e is properly configured to decrypt either of them correctly based on the nonce values N1 and N2 set by second device 115-e.

At 430, first device 115-d may send an indication, such as an acknowledgment (ACK), to source device 110-b over piconet 405. In some cases, first device 115-d may send the ACK at 430 based at least in part on first device 115-d successfully decrypting and/or authenticating the packet received at 420. In some cases, first device 115-d may successfully decrypt the packet received at 420 based at least in part on the expected sequence number (e.g., SEQN=0) matching the actual sequence number 415 and/or the expected packet counter (e.g., C=x) matching the actual packet counter of the packet received at 420. After 430, first device 115-d may expect the next packet after the packet received at 420 to be the next packet received from source device 110-b over piconet 405.

At 435, source device 110-b may send a next packet over piconet 405. As shown, the packet at 435 may be associated with a particular sequence number 440 (e.g., SEQN=1 as shown).

At 445, first device 115-d may receive the next packet from source device 110-b. Based at least in part on first device 115-d successfully decrypting and/or authenticating the packet received at 420, first device 115-d may expect the next packet from source device 110-b (e.g., the packet at 435) to have a sequence number of one (e.g., SEQN=1) and a packet counter of C=x+1.

At 450, second device 115-e may expect to capture the next packet from source device 110-b (e.g., second device 115-e expects source device 110-b to send multiple packets in a stream of packets such as in an audio stream of packets, etc.). In some cases, before capturing a packet at 450 second device 115-e may expect the next packet to have a packet counter of C=x+1 and a sequence number of 1 (e.g., SEQN=1). However, at 450 second device 115-e may identify an error with the next packet (e.g., CRC error, etc.). For example, second device 115-e may determine that a packet is received at 450, but is received partially or with errors (e.g., a CRC error). In one example, second device 115-e may capture the next packet at 450, decrypt the next packet using a nonce set based at least in part on the expected packet counter C=x+1 and/or the expected sequence number SEQN=1. After decrypting, however, second device 115-e may determine that a CRC error exists associated with the packet with a packet counter C=x+1 and sequence number SEQN=1. Accordingly, second device 115-e may set the expected packet counter of the next packet to C=x+2 and the expected sequence number of the next packet to SEQN=1, and set the expected packet counter of the after next packet to C=x+3 and the expected sequence number of the after next packet to SEQN=0.

Thus, after receiving an error for the packet at 450 with packet counter C=x+1 and SEQN=1, second device 115-e may set a second nonce value N2 based on next expected packet counter C=x+2 corresponding to sequence number SEQN=0, and set a first nonce value N1 based on after next expected packet counter C=x+3 corresponding to sequence number SEQN=1. Then if a packet associated with either a packet value of C=x+2 or C=x+3 arrives next, second device 115-e is properly configured to decrypt either of them correctly based on these updated nonce values.

At 455, first device 115-d may send an indication, such as an acknowledgment (ACK), to source device 110-b over piconet 405. In some cases, first device 115-d may send the ACK at 455 based at least in part on first device 115-d successfully decrypting and/or authenticating the packet received at 445. In some cases, first device 115-d may decrypt and/or authenticate the packet based at least in part on the expected sequence number (e.g., SEQN=1) matching the actual sequence number 440 and/or the expected packet counter (e.g., C=x+1) matching the actual packet counter of the packet received at 445.

At 460, source device 110-b may send a next packet over piconet 405. As shown, the packet at 460 may be associated with a particular sequence number 465 (e.g., SEQN=0 as shown).

At 470, first device 115-d may receive the next packet from source device 110-b. Based at least in part on first device 115-d successfully decrypting and/or authenticating the packet received at 445, first device 115-d may expect the next packet from source device 110-b (e.g., the packet at 460) to have a sequence number of one (e.g., SEQN=0) and a packet counter of C=x+2.

At 475, second device 115-e may expect to capture the next packet from source device 110-b (e.g., second device 115-e expects source device 110-b to send multiple packets in a stream of packets such as in an audio stream of packets, etc.). However, at 475 second device 115-e may fail to detect the next packet sent by source device 110-b at 460. Because second device 115-e fails to detect the next packet sent by source device 110-b at 460, at 475 second device 115-e may set or maintain the second nonce value N2 that is based on C=x+2 corresponding to sequence number SEQN=0, and set or maintain the first nonce value N1 that is based on C=x+3 corresponding to sequence number SEQN=1.

At 480, first device 115-d may send an acknowledgment (ACK) to source device 110-b over piconet 405. In some cases, first device 115-d may send the ACK at 480 based at least in part on first device 115-d successfully decrypting and/or authenticating the packet received at 470.

At 485, source device 110-b may send a next packet over piconet 405. As shown, the packet at 485 may be associated with a particular sequence number 486 (e.g., SEQN=1 as shown).

At 488, first device 115-d may receive the next packet from source device 110-b. Based at least in part on first device 115-d successfully decrypting and/or authenticating the packet received at 470, first device 115-d may be configured to expect the next packet from source device 110-b (e.g., the packet at 485) to have a sequence number of one (e.g., SEQN=1) and a packet counter of C=x+3. Based on this configuration, first device 115-d may successfully decrypt/authenticate the packet received at 488.

At 490, second device 115-e may expect to capture the next packet from source device 110-b (e.g., second device 115-e expect source device 110-b to send multiple packets in a stream of packets such as in an audio stream of packets, etc.). In some cases, after the CRC error at 450 and failing to detect the packet at 475, and before capturing a packet at 490, second device 115-e may expect the next packet to have a packet counter of C=x+2 and a sequence number of 0 (e.g., SEQN=0). For example, at 490 second device 115-e may set or maintain the second nonce value N2 that is based on a next expected packet counter C=x+2 corresponding to sequence number SEQN=0, and set or maintain the first nonce value N1 that is based on an after next expected packet counter C=x+3 corresponding to sequence number SEQN=1.

At 490, second device 115-e may sniff piconet 405 and as a result may capture the packet source device 110-b sends at 485 to first device 115-d. Second device 115-e may analyze the packet captured at 490. In some cases, second device 115-e may determine that the actual sequence number 486 of the captured packet is associated with a sequence number SEQN=1. Accordingly, second device 115-e may determine that the captured packet is associated with a packet counter of C=x+3 corresponding to sequence number SEQN=1. Thus, second device 115-e may use the first nonce N1 to successfully decrypt the packet captured at 490.

At 492, first device 115-d may send an acknowledgment (ACK) to source device 110-b over piconet 405. In some cases, first device 115-d may send the ACK at 492 based at least in part on first device 115-d successfully decrypting and/or authenticating the packet received at 488. The present techniques enable wireless communication system 400 to recover in real time when a secondary device detects an error (e.g., CRC error) and then subsequently drops a packet. As explained above, wireless communication system 400 enables a secondary device (e.g., second device 115-e) that is sniffing packets sent by a source device (e.g., source device 110-b) to a primary device (e.g., first device 115-d) to avoid communication errors (e.g., MIC errors, CRC errors, etc.) caused by a mismatching packet counter with a first packet and to avoid additional communication errors after a second packet is not heard or captured after receiving the first packet.

Figure 5:
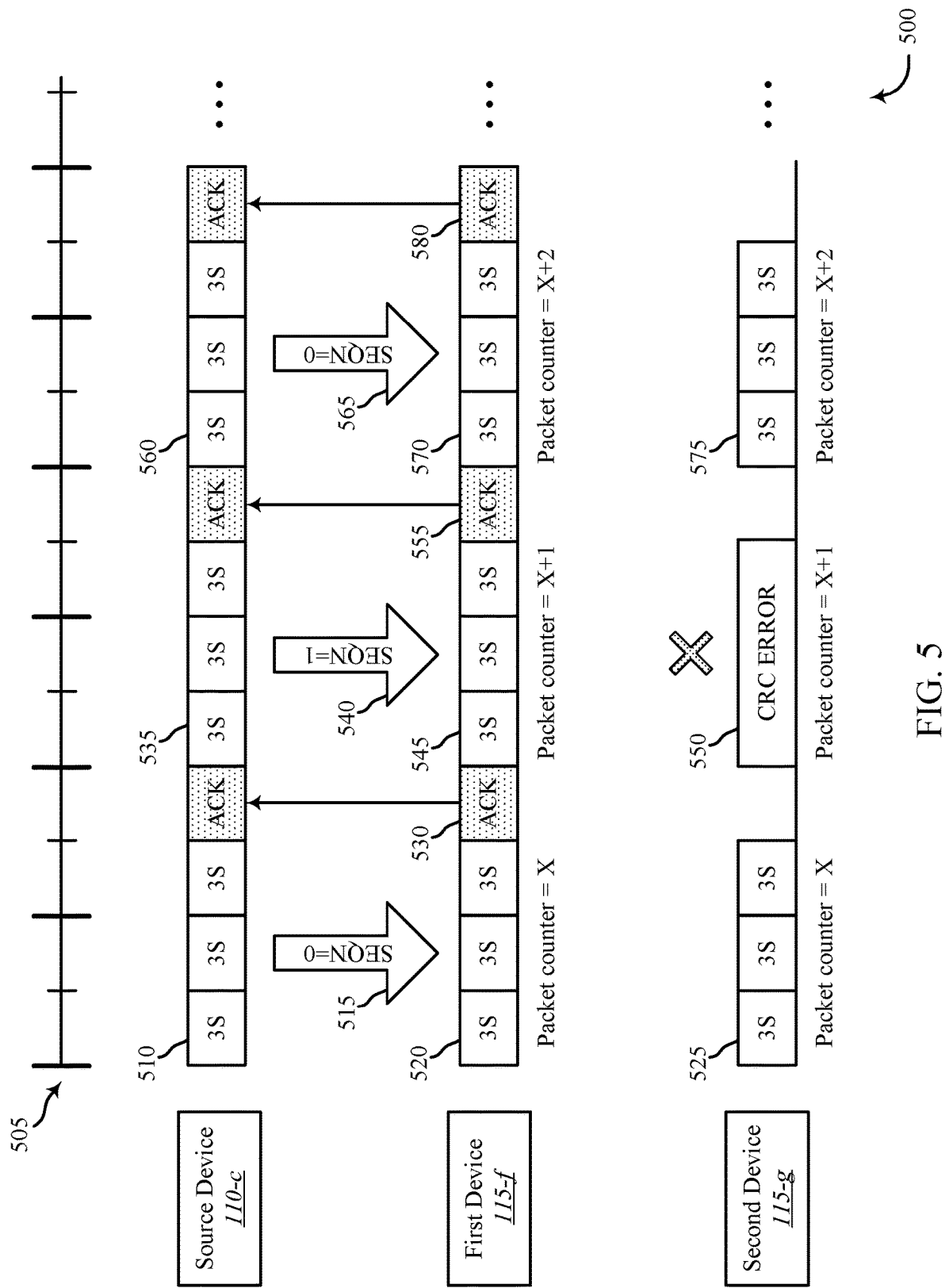
FIG. 5 illustrates an example of a wireless communication system that supports real time packet decryption in accordance with aspects of the present disclosure.

FIG. 5 illustrates an example of a wireless communication system 500 that supports real time MIC recovery in accordance with aspects of the present disclosure. In some examples, wireless communication system 500 may implement aspects of wireless communications system 100.

As illustrated, system 500 may include source device 110-c, first device 115-f, and second device 115-g. The illustrated source device 110-c may be an example of any one of devices 110 from FIG. 1. Similarly, first device 115-f and/or second device 115-g may be examples of any one of devices 115 from FIGS. 1, 2, and/or 4.

In the illustrated example, piconet 505 may be established between source device 110-c and first device 115-f. In some cases, second device 115-g may be configured to sniff packets sent by source device 110-c to first device 115-f over piconet 505.

At 510, source device 110-c may send a packet (e.g., a 3-slot packet) to first device 115-f. Although 3-slot packets are shown in the illustrated example, it is understood that source device 110-c may send any combination of 1-slot packets, 3-slot packets, and 5-slot packets to first device 115-f over piconet 505. As shown, the packet at 510 may be associated with a particular sequence number 515 (e.g., SEQN=0 as shown). In some cases, the packet sent at 510 may be encrypted by source device 110-c. In some cases, the encryption of the packet sent at 510 may be based at least in part on a packet counter of the packet.

At 520, first device 115-f may receive the packet sent by source device 110-c at 510. As shown, first device 115-f may expect the next packet from source device 110-c (e.g., the packet sent at 510) to have a sequence number of zero (e.g., SEQN=0) and packet counter of C=x.

At 525, second device 115-g may sniff piconet 505 and as a result may capture the packet source device 110-c sends at 510 to first device 115-f. In some cases, before capturing the packet at 525 second device 115-g may also expect the next packet from source device 110-c (e.g., the packet sent at 510) to have a sequence number of zero (e.g., SEQN=0) and packet counter of C=x. Accordingly, the configuration of second device 115-g may enable second device 115-g to decrypt and/or authenticate the packet captured at 525 based at least in part on the expected sequence number (e.g., SEQN=0) matching the actual sequence number 515 and/or the expected packet counter (e.g., C=x) matching the actual packet counter of the packet received at 525.

Based on the successful decryption/authentication of the packet captured at 525, second device 115-g may set the expected packet counter of the next packet to C=x+1 and the expected sequence number of the next packet to SEQN=1. Accordingly, second device 115-g may set a first nonce value N1 based on the next expected packet counter C=x+1 corresponding to the next expected sequence number SEQN=1, and set a second nonce value N2 based on the after next expected packet counter C=x+2 corresponding to the after next expected sequence number SEQN=0. Thus, if a packet associated with either a packet value of C=x+1 or C=x+2 arrives next, second device 115-g is properly configured to decrypt either of them correctly based on the nonce values N1 and N2 set by second device 115-g.

At 530, first device 115-f may send an acknowledgment (ACK) to source device 110-c over piconet 505. In some cases, first device 115-f may send the ACK at 530 based at least in part on first device 115-f successfully decrypting and/or authenticating the packet received at 520. In some cases, first device 115-f may successfully decrypt the packet received at 520 based at least in part on the expected sequence number (e.g., SEQN=0) matching the actual sequence number 515 and/or the expected packet counter (e.g., C=x) matching the actual packet counter of the packet received at 520. After 530, first device 115-f may expect the next packet after the packet received at 520 to be the next packet received from source device 110-c over piconet 505.

At 535, source device 110-c may send a next packet over piconet 505. As shown, in some examples, the packet at 535 may be associated with a particular sequence number 540 (e.g., SEQN=1 as shown).

At 545, first device 115-f may receive the next packet from source device 110-c. Based at least in part on first device 115-f successfully decrypting and/or authenticating the packet received at 520, first device 115-f may expect the next packet from source device 110-c (e.g., the packet at 535) to have a sequence number of one (e.g., SEQN=1) and a packet counter of C=x+1.

At 550, second device 115-g may expect to capture the next packet from source device 110-c (e.g., second device 115-e expects source device 110-b to send multiple packets in a stream of packets such as in an audio stream of packets, etc.). In some cases, before capturing a packet at 550 second device 115-g may expect the next packet to have a packet counter of C=x+1 and a sequence number of 1 (e.g., SEQN=1). However, at 550 second device 115-g may identify a CRC error with the next packet.

For example, second device 115-g may determine that a packet is received at 550, but is received partially or with errors (e.g., a CRC error as one example). After detecting an error with sniffing the packet from 535, second device 115-g may set the expected packet counter of the next packet to C=x+2 and the expected sequence number of the next packet to SEQN=1, and set the expected packet counter of the after next packet to C=x+3 and the expected sequence number of the after next packet to SEQN=0. Thus, after receiving an error for the packet at 550 with packet counter C=x+1 and SEQN=1, second device 115-g may set a second nonce value N2 based on next expected packet counter C=x+2 corresponding to sequence number SEQN=0, and set a first nonce value N1 based on after next expected packet counter C=x+3 corresponding to sequence number SEQN=1. Then if a packet associated with either a packet value of C=x+2 or C=x+3 arrives next, second device 115-g is properly configured to decrypt either of them correctly based on these updated nonce values.

At 555, first device 115-f may send an acknowledgment (ACK) to source device 110-c over piconet 505. In some cases, first device 115-f may send the ACK at 555 based at least in part on first device 115-f successfully decrypting and/or authenticating the packet received at 545. In some cases, first device 115-f may decrypt and/or authenticate the packet based at least in part on the expected sequence number (e.g., SEQN=1) matching the actual sequence number 540 and/or the expected packet counter (e.g., C=x+1) matching the actual packet counter of the packet received at 545.

At 560, source device 110-c may send a next packet over piconet 505. As shown, the packet at 560 may be associated with a particular sequence number 565 (e.g., SEQN=0 as shown).

At 570, first device 115-f may receive the next packet from source device 110-c. Based at least in part on first device 115-f successfully decrypting and/or authenticating the packet received at 545, first device 115-f may expect the next packet from source device 110-c (e.g., the packet at 560) to have a sequence number of one (e.g., SEQN=0) and a packet counter of C=x+2.

At 575, second device 115-g may sniff piconet 505 and as a result may capture the packet source device 110-c sends at 560 to first device 115-f. In some cases, before capturing the packet at 575 second device 115-g may also expect the next packet from source device 110-c (e.g., the packet sent at 560) to have a sequence number of zero (e.g., SEQN=0) and packet counter of C=x+2. For example, at 550 second device 115-g may have set a second nonce value N2 based on next expected packet counter C=x+2 corresponding to sequence number SEQN=0, and set a first nonce value N1 based on after next expected packet counter C=x+3 corresponding to sequence number SEQN=1. Accordingly, the configuration of second device 115-g may enable second device 115-g to use the second nonce value N2 to decrypt and/or authenticate the packet captured at 575 based at least in part on the expected sequence number (e.g., SEQN=0) matching the actual sequence number 565 and/or the expected packet counter (e.g., C=x+2) matching the actual packet counter of the packet received at 575.

Based on the successful decryption/authentication of the packet captured at 575, second device 115-g may set the expected packet counter of the next packet to C=x+3 and the expected sequence number of the next packet to SEQN=1. Accordingly, second device 115-g may set a first nonce value N1 based on the next expected packet counter C=x+3 corresponding to the next expected sequence number SEQN=1, and set a second nonce value N2 based on the after next expected packet counter C=x+4 corresponding to the after next expected sequence number SEQN=0. Thus, if a packet associated with either a packet value of C=x+3 or C=x+4 arrives next, second device 115-g is properly configured to decrypt either of them correctly based on the nonce values N1 and N2 set by second device 115-g. The present techniques enable wireless communication system 500 to recover in real time when a secondary device detects an error (e.g., CRC error) in a first packet and then subsequently the secondary device correctly detects the subsequent second packet. As explained above, wireless communication system 500 enables a secondary device (e.g., device 115-g) that is sniffing packets sent by a source device (e.g., source device 110-c) to a primary device (e.g., first device 115-f) to correct communication errors (e.g., MIC errors, CRC errors, etc.) associated with a first packet and avoiding additional communication errors after receiving a subsequent second packet without errors.

Figure 6:
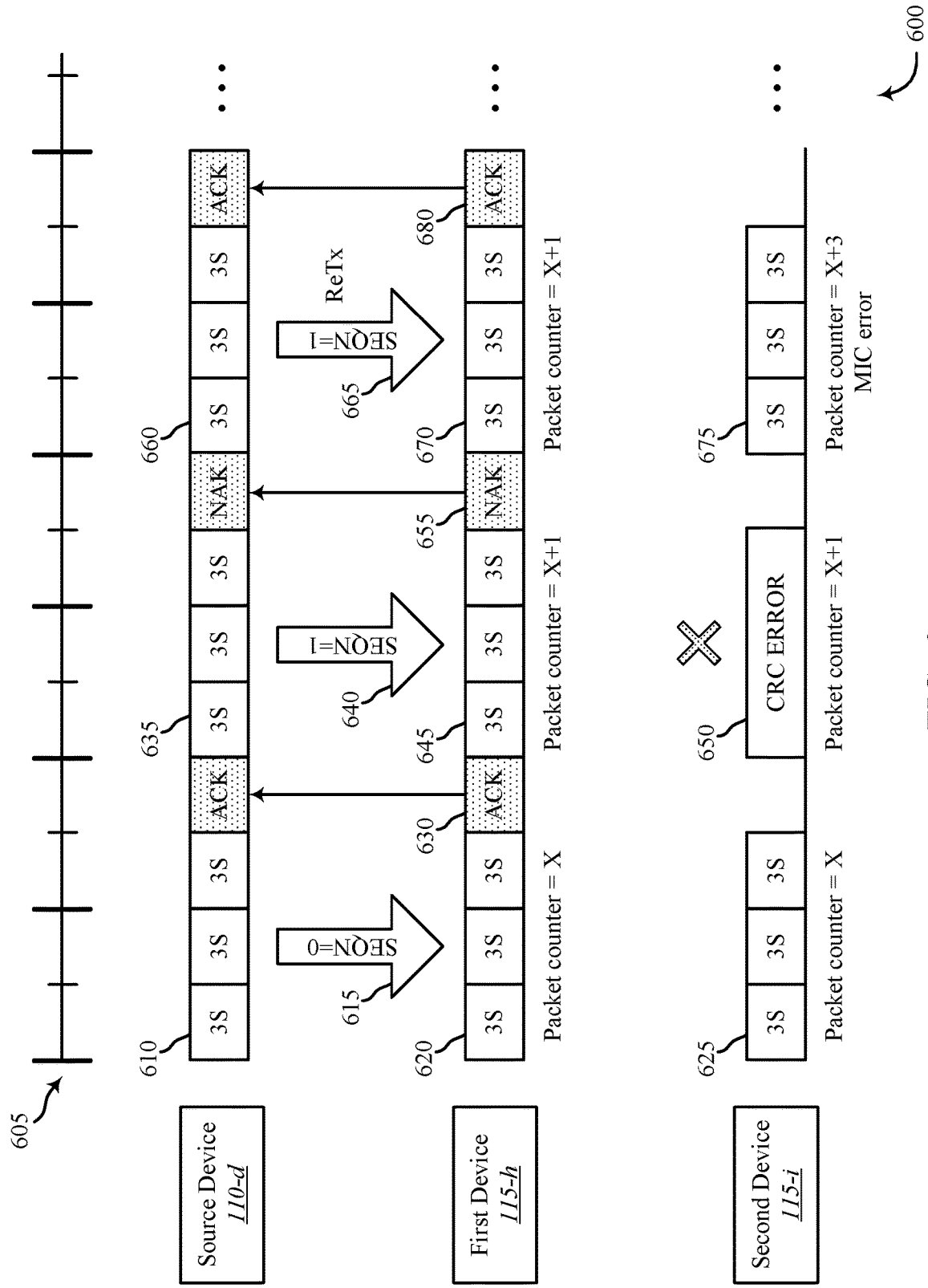
FIG. 6 illustrates an example of a wireless communication system that supports real time packet decryption in accordance with aspects of the present disclosure.

FIG. 6 illustrates an example of a wireless communication system 600 that supports real time MIC recovery in accordance with aspects of the present disclosure. In some examples, wireless communication system 600 may implement aspects of wireless communications system 100.

As illustrated, system 600 may include source device 110-d, first device 115-h, and second device 115-i. The illustrated source device 110-d may be an example of any one of devices 110 from FIG. 1. Similarly, first device 115-h and/or second device 115-i may be examples of any one of devices 115 from FIGS. 1 and/or 2.

In the illustrated example, piconet 605 may be established between source device 110-d and first device 115-h. In some cases, second device 115-i may be configured to sniff packets sent by source device 110-d to first device 115-h over piconet 605.

At 610, source device 110-d may send a packet (e.g., a 3-slot packet as shown taking 3 slots to transmit as one example) to first device 115-h. In some cases, the packet at 610 may be associated with a particular sequence number 615 (e.g., SEQN=0 as shown). In some cases, the packet sent at 610 may be encrypted by source device 110-d. In some cases, the encryption of the packet sent at 610 may be based at least in part on a packet counter of the packet.

At 620, first device 115-h may receive the packet sent by source device 110-d at 610. As shown, first device 115-h may expect the next packet from source device 110-d (e.g., the packet sent at 610) to have a sequence number of zero (e.g., SEQN=0) and packet counter of C=x.

At 625, second device 115-i may sniff piconet 605 and as a result may capture the packet source device 110-d sends at 610 to first device 115-h. In some cases, before capturing the packet at 625 second device 115-i may also expect the next packet from source device 110-d (e.g., the packet sent at 610) to have a sequence number of zero (e.g., SEQN=0) and packet counter of C=x. Accordingly, second device 115-i may be enabled to decrypt and/or authenticate the packet captured at 625 based at least in part on the expected sequence number (e.g., SEQN=0) matching the actual sequence number 615 and/or the expected packet counter (e.g., C=x) matching the actual packet counter of the packet received at 625.

Based on the successful decryption/authentication of the packet captured at 625, second device 115-i may set the expected packet counter of the next packet to C=x+1 and the expected sequence number of the next packet to SEQN=1. Accordingly, second device 115-i may set a first nonce value N1 based on the next expected packet counter C=x+1 corresponding to the next expected sequence number SEQN=1, and set a second nonce value N2 based on the after next expected packet counter C=x+2 corresponding to the after next expected sequence number SEQN=0. Thus, if a packet associated with either a packet value of C=x+1 or C=x+2 arrives next, second device 115-i is properly configured to decrypt either of them correctly based on the nonce values N1 and N2 set by second device 115-i.

At 630, first device 115-h may send an indication, such as an acknowledgment (ACK), to source device 110-d over piconet 605. In some cases, first device 115-h may send the ACK at 630 based at least in part on first device 115-h successfully decrypting and/or authenticating the packet received at 620. In some cases, first device 115-h may successfully decrypt the packet received at 620 using a nonce value in its configuration. In some cases, first device 115-*h* may use a particular nonce value based at least in part on the expected sequence number (e.g., SEQN=0) matching the actual sequence number 615 and/or the expected packet counter (e.g., C=x) matching the actual packet counter of the packet received at 620. After 630, first device 115-*h* may expect the next packet after the packet received at 620 to be the next packet received from source device 110-*d* over piconet 605.

At 635, source device 110-*d* may send a next packet over piconet 605. As shown, the packet at 635 may be associated with a particular sequence number 640 (e.g., SEQN=1 as shown) and packet counter C=x+1.

At 645, first device 115-*h* may receive the next packet from source device 110-*d*. Based at least in part on first device 115-*h* successfully decrypting and/or authenticating the packet received at 620, first device 115-*h* may expect the next packet from source device 110-*d* (e.g., the packet at 635) to have a sequence number of one (e.g., SEQN=1) and a packet counter of C=x+1.

At 650, second device 115-*i* may expect to capture the next packet from source device 110-*d* (e.g., second device 115-*e* expects source device 110-*b* to send multiple packets in a stream of packets such as in an audio stream of packets, etc.). In some cases, before capturing a packet at 650 second device 115-*i* may expect the next packet to have a packet counter of C=x+1 and a sequence number of 1 (e.g., SEQN=1). However, at 650 second device 115-*i* may identify an error with the next packet (e.g., CRC error, etc.). In one example, second device 115-*i* may determine that a packet is received at 650, but is received partially or with errors (e.g., a CRC error).

Based on the detected error, second device 115-*i* may set the expected packet counter of the next packet to C=x+2 and the expected sequence number of the next packet to SEQN=1, and also set the expected packet counter of the after next packet to C=x+3 and the expected sequence number of the after next packet to SEQN=0. Thus, after receiving an error for the packet at 650 with packet counter C=x+1 and SEQN=1, second device 115-*i* may set a second nonce value N2 based on next expected packet counter C=x+2 corresponding to sequence number SEQN=0, and set a first nonce value N1 based on after next expected packet counter C=x+3 corresponding to sequence number SEQN=1. Then if a packet associated with either a packet value of C=x+2 or C=x+3 arrives next, second device 115-*i* is properly configured to decrypt either of them correctly based on these updated nonce values.

At 655, first device 115-*h* may send an indication, such as a negative acknowledgment (NAK), to source device 110-*d* over piconet 605. In some examples, source device 110-*d* may interpret not receiving an ACK from first device 115-*h* as a NAK. For example, if first device 115-*h* fails to detect the packet at 645, first device 115-*h* may not send any type of acknowledgment at 655, and as a result source device 110-*d* may interpret the absence of an acknowledgment from first device 115-*h* as a NAK. In some cases, first device 115-*h* may send the NAK at 655 based at least in part on first device 115-*h* unsuccessfully decrypting or unsuccessfully authenticating the packet received at 645. In some cases, first device 115-*h* may send the NAK at 655 based at least in part on first device 115-*h* detecting an error in the packet at 645 (e.g., CRC error, etc.).

In some cases, first device 115-*h* may set or maintain a current configuration based on detecting the error with the packet at 645. For example, based on the successful decryption/authentication of the packet received at 620, first device 115-*h* may set or maintain the expected packet counter of the next packet to C=x+1 and the expected sequence number of the next packet to SEQN=1. Accordingly, the maintained configuration of first device 115-*h* may include a first nonce value N1 based on the next expected packet counter C=x+1 corresponding to the next expected sequence number SEQN=1, and a second nonce value N2 based on the after next expected packet counter C=x+2 corresponding to the after next expected sequence number SEQN=0. Thus, based on the reason (e.g., CRC error, etc.) for which first device 115-*h* sends the NAK at 655, first device 115-*h* may set or maintain a current configuration of the first nonce N1 and the second nonce N2.

At 660, source device 110-*d* may retransmit the packet from 635 over piconet 605 using the same sequence number and same packet counter. Accordingly, the sequence number 665 (e.g., SEQN=1 as shown) of the packet at 660 may have the same sequence number 640 associated with the packet from 635. Similarly, the packet counter of the packet at 660 may be the same as the packet counter as the packet at 635 (e.g., C=x+1).

At 670, first device 115-*h* may receive the next packet from source device 110-*d*. Based at least in part on first device 115-*h* successfully decrypting and/or authenticating the packet received at 645, first device 115-*h* may expect the next packet from source device 110-*d* (e.g., the packet at 660) to have a sequence number of one (e.g., SEQN=0) and a packet counter of C=x+2.

At 675, second device 115-*i* may sniff piconet 605 and as a result may capture the packet source device 110-*d* sends at 660 to first device 115-*h*. In some cases, before capturing the packet at 675 second device 115-*i* may expect the next packet from source device 110-*d* (e.g., the packet sent at 660) to have a sequence number of zero (e.g., SEQN=0) and packet counter of C=x+2. For example, at 650 second device 115-*i* may have set a second nonce value N2 based on next expected packet counter C=x+2 corresponding to sequence number SEQN=0, and set a first nonce value N1 based on after next expected packet counter C=x+3 corresponding to sequence number SEQN=1. In some cases, when second device 115-*i* receives the retransmission of the second packet with sequence number of one (e.g., SEQN=1), second device 115-*i* may determine that the packet counter is C=x+3 due to SEQN=1 being associated with packet counter C=x+3 in the most recent configuration of nonce values (e.g., N1 and N2) by second device 115-*i*. In some cases, second device 115-*i* may attempt to decrypt the packet at 675 using first nonce value N1 based on the packet at 675 corresponding to sequence number SEQN=1.

For example, second device 115-*i* may at first determine (e.g., at first determine incorrectly) that the packet at 675 corresponding to sequence number SEQN=1 indicates that another packet with SEQN=0 and packet counter C=x+2 was sent by source device 110-*d* to first device 115-*h*, but not detected by second device 115-*i*. In any case, in one example second device 115-*i* may experience an MIC error at 675 when it attempts to decrypt the retransmitted packet using a mismatching nonce based on the mismatching packet counter, and as a result second device 115-*i* may discard the retransmission of the second packet at 675.

In some cases, because second device 115-*i* detects an MIC error when decrypting the retransmitted packet at 675, second device 115-*i* may retain its current configuration of nonce value N2 set to C=x+2 corresponding to sequence number SEQN=0, and nonce value N1 set to C=x+3 corresponding to sequence number SEQN=1. For example, second device 115-i may determine that the MIC error was caused by the packet at 660 being a retransmission of the packet at 635 with packet counter C=x+1 and sequence number SEQN=1. Accordingly, on a subsequent transmission after the retransmission at 660, second device 115-i may set or maintain its current configuration enabling second device 115-i to enable it to decrypt a packet with packet counter C=x+2 and/or decrypt a packet with packet counter C=x+3. Thus, after the MIC error on the retransmission at 660, second device 115-i may expect the next transmission to include a packet with packet counter C=x+2 corresponding to sequence number SEQN=0, or a packet with packet counter C=x+3 corresponding to sequence number SEQN=1 in the case that the packet with packet counter C=x+2 corresponding to sequence number SEQN=0 is missed by second device 115-i in the next transmission by source device 110-d after source device 110-d receives the ACK at 680.

At 680, first device 115-h may send an acknowledgment (ACK) to source device 110-d over piconet 605. In some cases, first device 115-h may send the ACK at 680 based at least in part on first device 115-h successfully decrypting and/or authenticating the packet received at 670. The present techniques enable wireless communication system 600 to recover in real time when a secondary device detects an error (e.g., CRC error) in a first packet and then subsequently the secondary device receives a retransmission of the first packet. As explained above, wireless communication system 600 enables a secondary device (e.g., second device 115-i) that is sniffing packets sent by a source device (e.g., source device 110-d) to a primary device (e.g., first device 115-h) to avoid communication errors (e.g., MIC errors, CRC errors, etc.) caused by a mismatching packet counter with a first packet and to avoid additional communication errors after the secondary device subsequently captures a retransmission of the first packet. Accordingly, wireless communications system 600 to recover from various scenarios of communication errors (e.g., MIC errors, CRC errors, etc.) in real time, resulting in an improvement in the overall latency of the associated data traffic (e.g., A2DP traffic, etc.).

Figure 7:
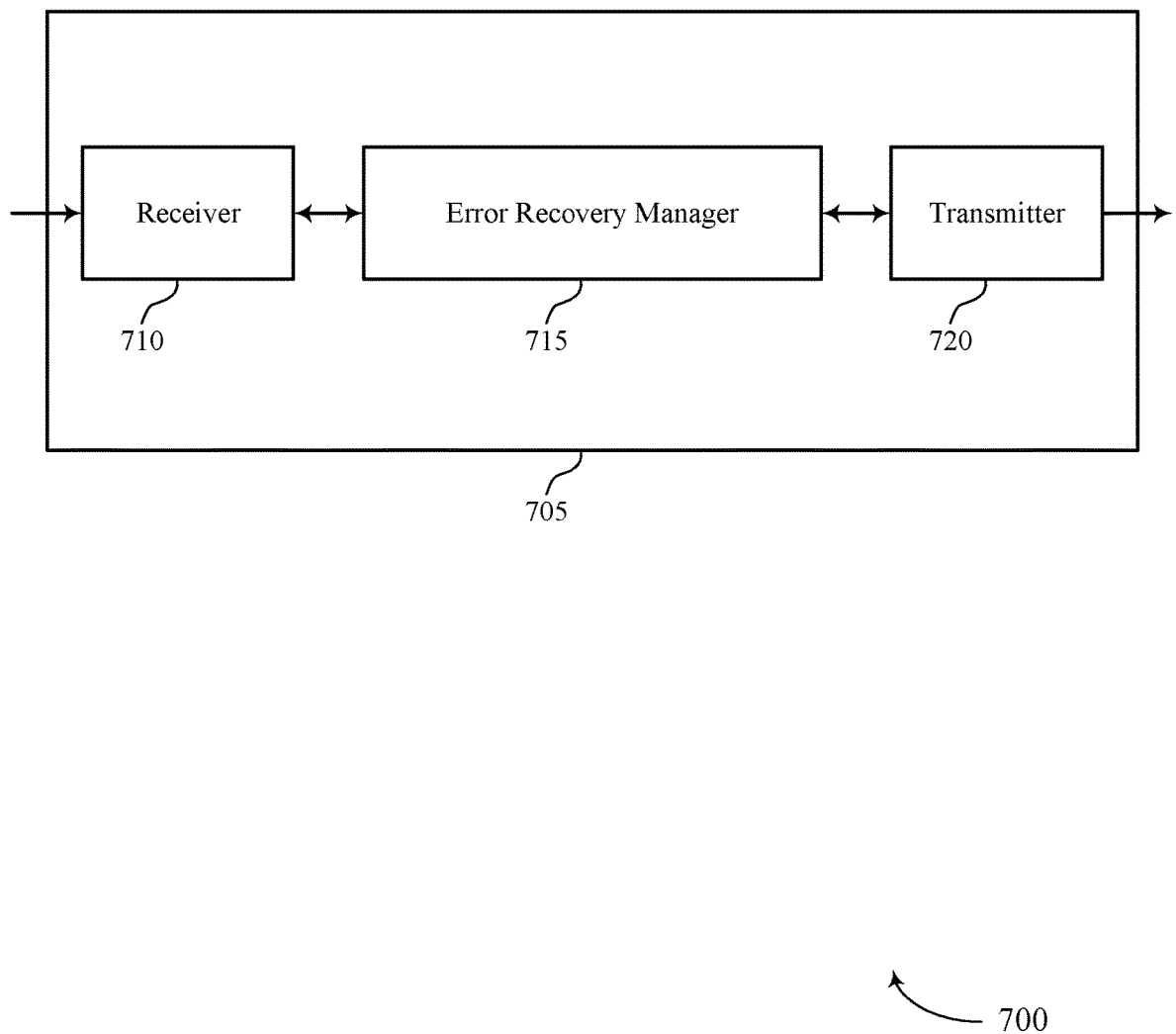
FIGS. 7 and 8 show block diagrams of devices that support real time MIC recovery in accordance with aspects of the present disclosure.

FIG. 7 shows a block diagram 700 of a device 705 that supports real time MIC recovery in accordance with aspects of the present disclosure. The device 705 may be an example of aspects of a device as described herein. The device 705 may include a receiver 710, an error recovery manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to real time MIC recovery, etc.). Information may be passed on to other components of the device 705. The receiver 710 may be an example of aspects of the transceiver 1020 described with reference to FIG. 10. The receiver 710 may utilize a single antenna or a set of antennas.

The error recovery manager 715 may identify, by a secondary wireless device communicatively linked with a primary wireless device, a first nonce value that is set based on a first packet counter value associated with a data packet stream between a source wireless device and the primary wireless device, receive, by the secondary wireless device, a first packet from the data packet stream, identify, by the secondary wireless device, a second nonce value that is set based on a second packet counter value associated with the data packet stream, determine, by the secondary wireless device, a sequence number for the first packet based on receiving the first packet, and decrypt, by the secondary wireless device, the first packet using the first nonce value or the second nonce value based on the sequence number for the first packet. The error recovery manager 715 may be an example of aspects of the error recovery manager 1010 described herein.

The error recovery manager 715, or its sub-components, may be implemented in hardware, code (e.g., software or firmware) executed by a processor, or any combination thereof. If implemented in code executed by a processor, the functions of the error recovery manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The error recovery manager 715, or its sub-components, may be physically located at various positions, including being distributed such that portions of functions are implemented at different physical locations by one or more physical components. In some examples, the error recovery manager 715, or its sub-components, may be a separate and distinct component in accordance with various aspects of the present disclosure. In some examples, the error recovery manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
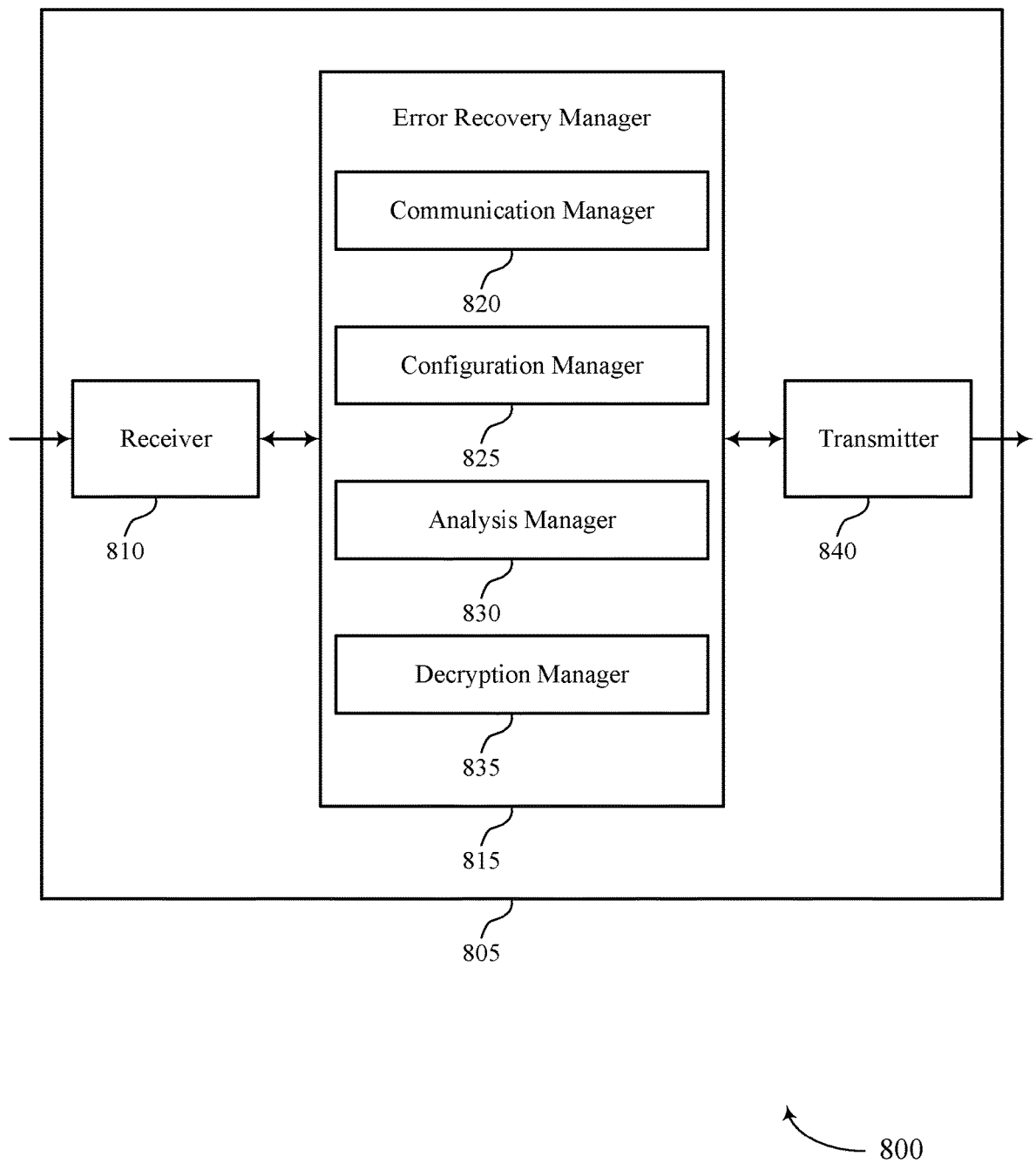

FIG. 8 shows a block diagram 800 of a device 805 that supports real time MIC recovery in accordance with aspects of the present disclosure. The device 805 may be an example of aspects of a device 705 or a device 115 as described herein. The device 805 may include a receiver 810, an error recovery manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to real time MIC recovery, etc.). Information may be passed on to other components of the device 805. The receiver 810 may be an example of aspects of the transceiver 1020 described with reference to FIG. 10. The receiver 810 may utilize a single antenna or a set of antennas.

The error recovery manager 815 may be an example of aspects of the error recovery manager 715 as described herein. The error recovery manager 815 may include a communication manager 820, a configuration manager 825, an analysis manager 830, and a decryption manager 835. The error recovery manager 815 may be an example of aspects of the error recovery manager 1010 described herein.

The communication manager 820 may identify, by a secondary wireless device communicatively linked with a primary wireless device, a first nonce value that is set based on a first packet counter value associated with a data packet stream between a source wireless device and the primary wireless device and receive, by the secondary wireless device, a first packet from the data packet stream.

The configuration manager 825 may identify, by the secondary wireless device, a second nonce value that is set based on a second packet counter value associated with the data packet stream. The analysis manager 830 may determine, by the secondary wireless device, a sequence number for the first packet based on receiving the first packet. The decryption manager 835 may decrypt, by the secondary wireless device, the first packet using the first nonce value or using the second nonce value, where either nonce value is based on a sequence number for a certain expected packet (e.g., the first packet, the second packet, etc.).

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
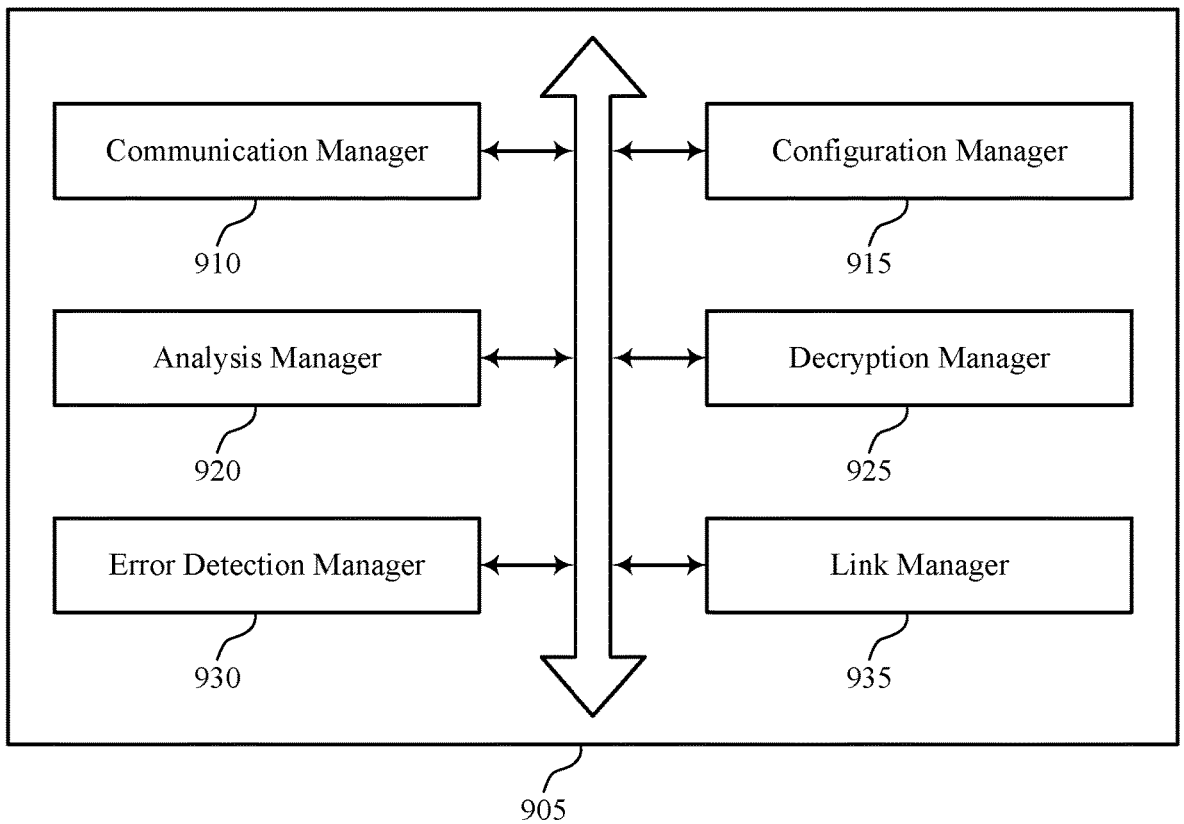
FIG. 9 shows a block diagram of an error recovery manager that supports real time MIC recovery in accordance with aspects of the present disclosure.

FIG. 9 shows a block diagram 900 of an error recovery manager 905 that supports real time MIC recovery in accordance with aspects of the present disclosure. The error recovery manager 905 may be an example of aspects of an error recovery manager 715, an error recovery manager 815, or an error recovery manager 1010 described herein. The error recovery manager 905 may include a communication manager 910, a configuration manager 915, an analysis manager 920, a decryption manager 925, an error detection manager 930, and a link manager 935. Each of these modules may communicate, directly or indirectly, with one another (e.g., via one or more buses).

The communication manager 910 may identify, by a secondary wireless device communicatively linked with a primary wireless device, a first nonce value that is set based on a first packet counter value associated with a data packet stream between a source wireless device and the primary wireless device.

In some examples, the communication manager 910 may receive, by the secondary wireless device, a first packet from the data packet stream. In some examples, the communication manager 910 may receive a second packet after receiving the first packet. In some examples, the communication manager 910 may receive the first packet over one or more time slots based on a size of a payload sent via the first packet.

In some examples, the communication manager 910 may receive a second packet over one or more time slots based on a size of a payload sent via the second packet. The configuration manager 915 may identify, by the secondary wireless device, a second nonce value that is set based on a second packet counter value associated with the data packet stream. The analysis manager 920 may determine, by the secondary wireless device, a sequence number for the first packet based on receiving the first packet.

In some examples, the analysis manager 920 may ignore the first packet based on detecting the CRC error. In some examples, the analysis manager 920 may determine that the first packet counter value indicates a count of the first packet as a next packet. In some examples, the analysis manager 920 may determine that the second packet counter value indicates a count of a second packet as a packet after the next packet.

The decryption manager 925 may decrypt, by the secondary wireless device, the first packet using the first nonce value or the second nonce value based on the sequence number for the first packet. In some examples, the decryption manager 925 may use the first nonce value to decrypt the first packet or authenticate the first packet, or both decrypt and authenticate the first packet, based on determining that the sequence number is equal to a first value.

In some examples, the decryption manager 925 may use the second nonce value to decrypt the first packet or authenticate the first packet, or both decrypt and authenticate the first packet, based on determining that the sequence number is equal to a second value. In some examples, the decryption manager 925 may use the first nonce value to decrypt the second packet or authenticate the second packet, or both decrypt and authenticate the second packet, when the determined sequence number includes an indication to use the second nonce value on the first packet.

In some examples, the decryption manager 925 may use the second nonce value to decrypt the second packet or authenticate the second packet, or both decrypt and authenticate the second packet, when the determined sequence number includes an indication to use the first nonce value on the first packet. The error detection manager 930 may detect, by the secondary wireless device, a CRC error on the first packet based on receiving the first packet and determining whether the first packet is received without error.

The link manager 935 may establish a first wireless link between the primary wireless device and the secondary wireless device based on powering on the primary wireless device or powering on the secondary wireless device, or powering on both the primary wireless device and the secondary wireless device. In some examples, the link manager 935 may establish a second wireless link between the primary wireless device and the source wireless device based on powering on the primary wireless device or powering on the source wireless device, or powering on both the primary wireless device and the secondary wireless device.

Figure 10:
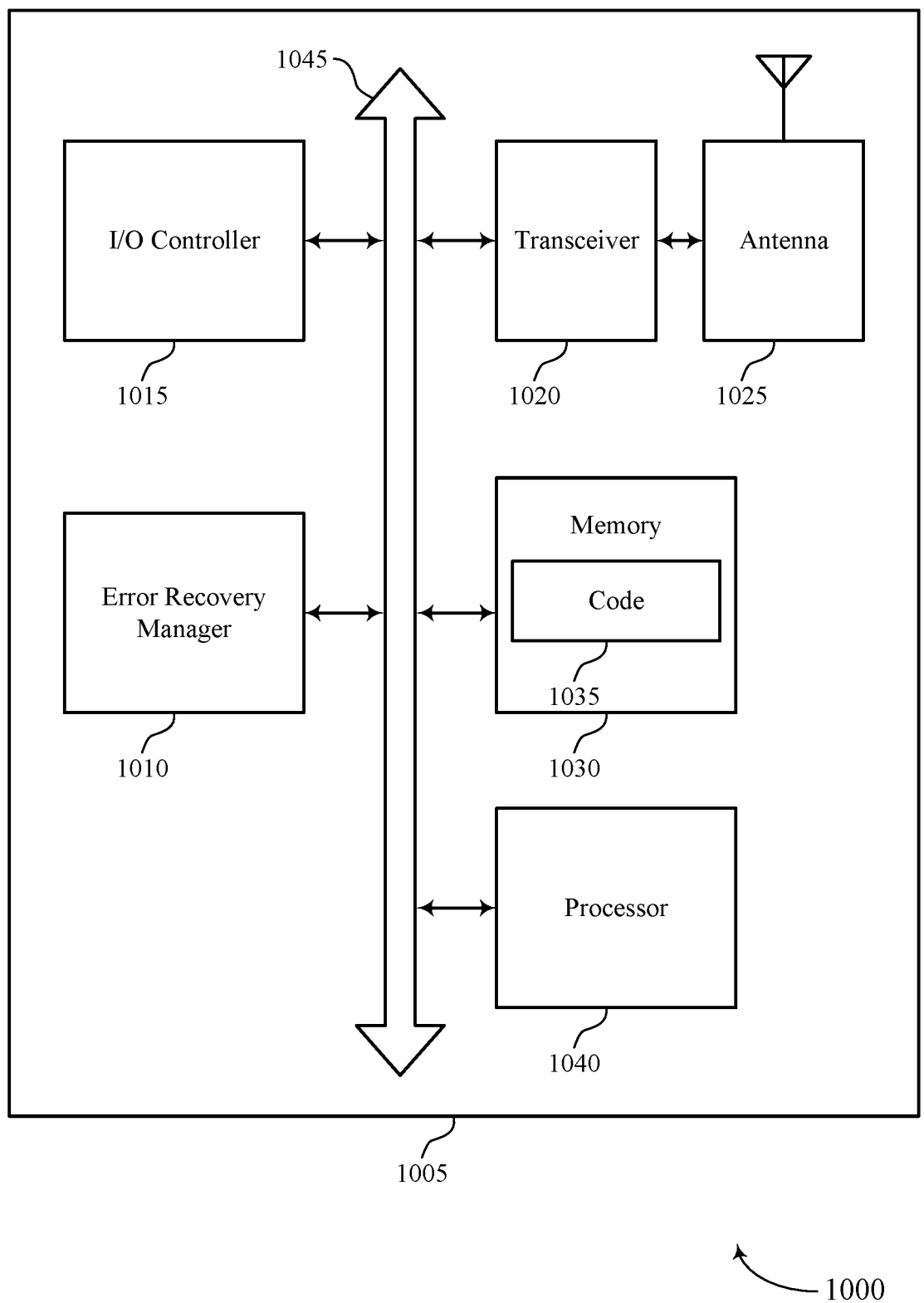
FIG. 10 shows a diagram of a system including a device that supports real time MIC recovery in accordance with aspects of the present disclosure.

FIG. 10 shows a diagram of a system 1000 including a device 1005 that supports real time MIC recovery in accordance with aspects of the present disclosure. The device 1005 may be an example of or include the components of device 705, device 805, or a device as described herein. The device 1005 may include components for bi-directional voice and data communications including components for transmitting and receiving communications, including an error recovery manager 1010, an I/O controller 1015, a transceiver 1020, an antenna 1025, memory 1030, and a processor 1040. These components may be in electronic communication via one or more buses (e.g., bus 1045).

The error recovery manager 1010 may identify, by a secondary wireless device communicatively linked with a primary wireless device, a first nonce value that is set based on a first packet counter value associated with a data packet stream between a source wireless device and the primary wireless device, receive, by the secondary wireless device, a first packet from the data packet stream, identify, by the secondary wireless device, a second nonce value that is set based on a second packet counter value associated with the data packet stream, determine, by the secondary wireless device, a sequence number for the first packet based on receiving the first packet, and decrypt, by the secondary wireless device, the first packet using the first nonce value or the second nonce value based on the sequence number for the first packet.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting real time MIC recovery).

The code 1035 may include instructions to implement aspects of the present disclosure, including instructions to support real time error recovery. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
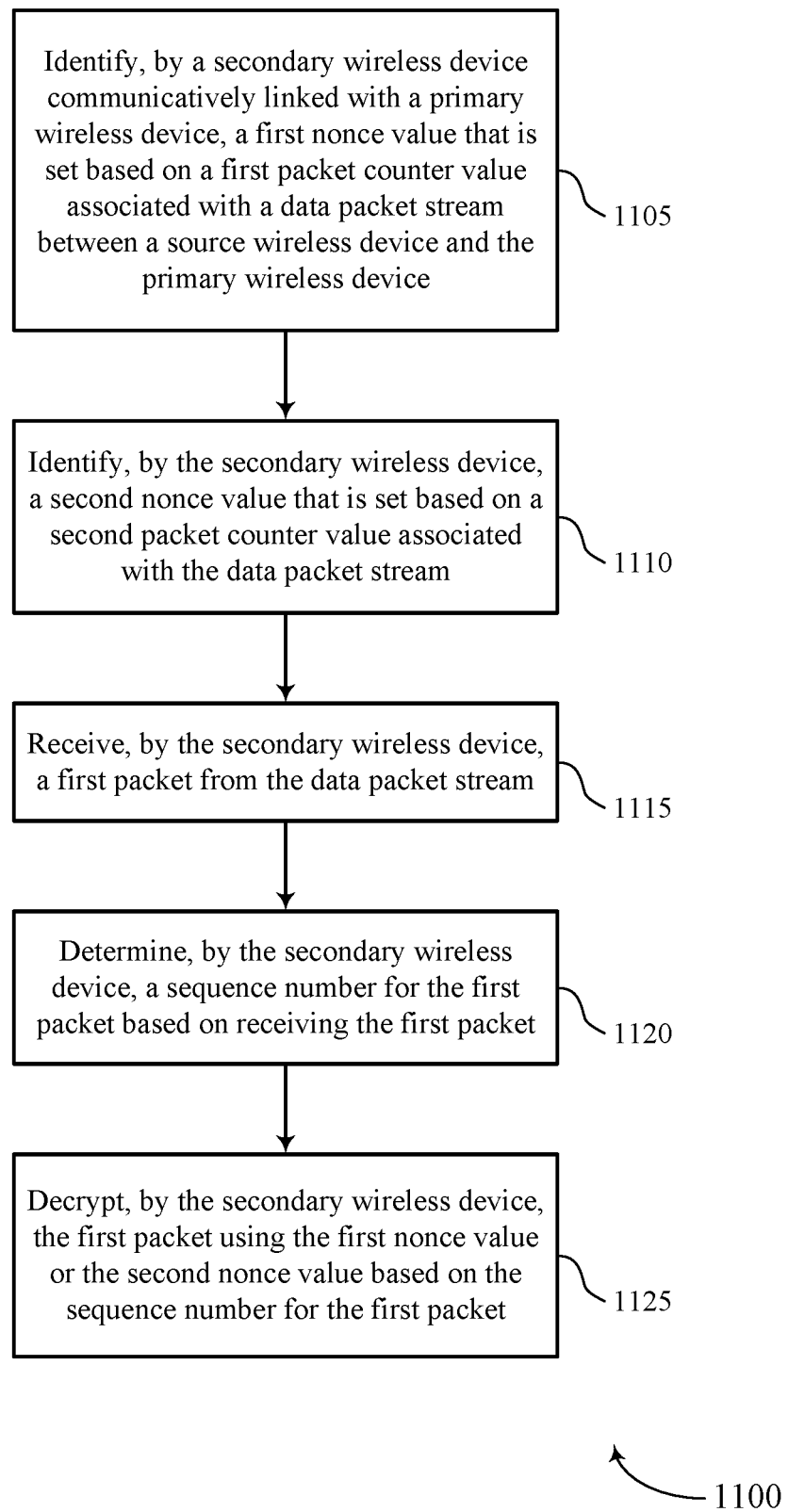
FIGS. 11 and 12 show flowcharts illustrating methods that support real time MIC recovery in accordance with aspects of the present disclosure.

FIG. 11 shows a flowchart illustrating a method 1100 that supports real time MIC recovery in accordance with aspects of the present disclosure. The operations of method 1100 may be implemented by a device or its components as described herein. For example, the operations of method 1100 may be performed by an error recovery manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1105, the device may identify, by a secondary wireless device communicatively linked with a primary wireless device, a first nonce value that is set based on a first packet counter value associated with a data packet stream between a source wireless device and the primary wireless device. The operations of 1105 may be performed according to the methods described herein. In some examples, aspects of the operations of 1105 may be performed by a communication manager as described with reference to FIGS. 7 through 10.

At 1110, the device may identify, by the secondary wireless device, a second nonce value that is set based on a second packet counter value associated with the data packet stream. The operations of 1110 may be performed according to the methods described herein. In some examples, aspects of the operations of 1110 may be performed by a configuration manager as described with reference to FIGS. 7 through 10.

At 1115, the device may receive, by the secondary wireless device, a first packet from the data packet stream. The operations of 1115 may be performed according to the methods described herein. In some examples, aspects of the operations of 1115 may be performed by a communication manager as described with reference to FIGS. 7 through 10.

At 1120, the device may determine, by the secondary wireless device, a sequence number for the first packet based on receiving the first packet. The operations of 1120 may be performed according to the methods described herein. In some examples, aspects of the operations of 1120 may be performed by an analysis manager as described with reference to FIGS. 7 through 10.

At 1125, the device may decrypt, by the secondary wireless device, the first packet using the first nonce value or the second nonce value based on the sequence number for the first packet. The operations of 1125 may be performed according to the methods described herein. In some examples, aspects of the operations of 1125 may be performed by a decryption manager as described with reference to FIGS. 7 through 10.

Figure 12:
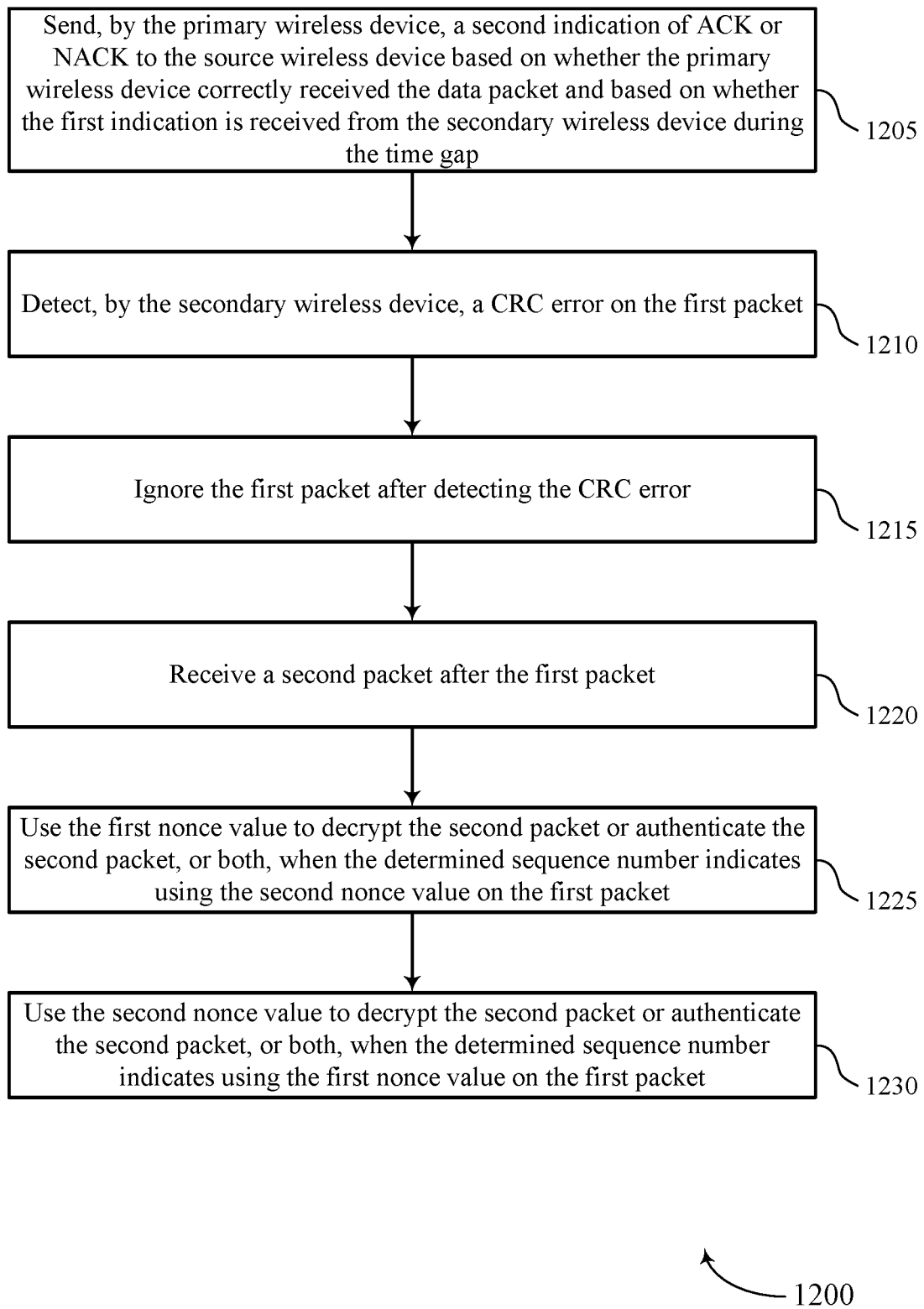

FIG. 12 shows a flowchart illustrating a method 1200 that supports real time MIC recovery in accordance with aspects of the present disclosure. The operations of method 1200 may be implemented by a device or its components as described herein. For example, the operations of method 1200 may be performed by an error recovery manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1205, the device may send, by the primary wireless device, a second indication of ACK or NACK to the source wireless device based on whether the primary wireless device correctly received the data packet and based on whether the first indication is received from the secondary wireless device during the time gap. The operations of 1205 may be performed according to the methods described herein. In some examples, aspects of the operations of 1205 may be performed by an acknowledgement manager as described with reference to FIGS. 7 through 10.

At 1210, the device may detect, by the secondary wireless device, a CRC error on the first packet. The operations of 1210 may be performed according to the methods described herein. In some examples, aspects of the operations of 1210 may be performed by an error detection manager as described with reference to FIGS. 7 through 10.

At 1215, the device may ignore the first packet after detecting the CRC error. The operations of 1215 may be performed according to the methods described herein. In some examples, aspects of the operations of 1215 may be performed by an error detection manager as described with reference to FIGS. 7 through 10.

At 1220, the device may receive a second packet after the first packet. The operations of 1220 may be performed according to the methods described herein. In some examples, aspects of the operations of 1220 may be performed by a data manager as described with reference to FIGS. 7 through 10.

At 1225, the device may use the first nonce value to decrypt the second packet or authenticate the second packet, or both decrypt and authenticate the second packet, when the determined sequence number indicates using the second nonce value on the first packet. The operations of 1225 may be performed according to the methods described herein. In some examples, aspects of the operations of 1225 may be performed by a decryption manager as described with reference to FIGS. 7 through 10.

At 1230, the device may use the second nonce value to decrypt the second packet or authenticate the second packet, or both decrypt and authenticate the second packet, when the determined sequence number indicates using the first nonce value on the first packet. The operations of 1230 may be performed according to the methods described herein. In some examples, aspects of the operations of 1230 may be performed by a decryption manager as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for real time packet decryption, comprising:
identifying, by a secondary wireless device communicatively linked with a primary wireless device, a first nonce value that is set based at least in part on a first packet counter value associated with a data packet stream between a source wireless device and the primary wireless device;
identifying, by the secondary wireless device, a second nonce value that is set based at least in part on a second packet counter value associated with the data packet stream;
receiving, by the secondary wireless device, a first packet from the data packet stream;
determining, by the secondary wireless device, a sequence number for the first packet based at least in part on receiving the first packet;
selecting, by the secondary wireless device, the first nonce value or the second nonce value based at least in part on the sequence number for the first packet; and
decrypting, by the secondary wireless device, the first packet using the selected nonce value.

2. The method of claim 1, wherein selecting the first packet comprises:
selecting the first nonce value to decrypt the first packet or authenticate the first packet, or both, based at least in part on determining that the sequence number is equal to a first value.

3. The method of claim 1, wherein selecting the first packet comprises:
selecting the second nonce value to decrypt the first packet or authenticate the first packet, or both, based at least in part on determining that the sequence number is equal to a second value.

4. The method of claim 1, further comprising:
detecting, by the secondary wireless device, a cyclic redundancy check (CRC) error on the first packet based at least in part on receiving the first packet and determining whether the first packet is received without error; and
ignoring the first packet based at least in part on detecting the CRC error.

5. The method of claim 4, further comprising:
receiving a second packet after receiving the first packet; and
using the first nonce value to decrypt the second packet or authenticate the second packet, or both, when the determined sequence number includes an indication to use the second nonce value on the first packet.

6. The method of claim 5, further comprising:
using the second nonce value to decrypt the second packet or authenticate the second packet, or both, when the determined sequence number includes an indication to use the first nonce value on the first packet.

7. The method of claim 1, further comprising:
determining that the first packet counter value indicates a count of the first packet as a next packet; and
determining that the second packet counter value indicates a count of a second packet as a packet after the next packet.

8. The method of claim 1, further comprising:
establishing a first wireless link between the primary wireless device and the secondary wireless device based at least in part on powering on the primary wireless device or powering on the secondary wireless device, or both; and
establishing a second wireless link between the primary wireless device and the source wireless device based at least in part on powering on the primary wireless device or powering on the source wireless device, or both.

9. The method of claim 8, wherein the first wireless link between the primary wireless device and the secondary wireless device includes an encrypted piconet link.

10. The method of claim 1, wherein:
a payload of the first packet comprises one or more time slots; and
receiving a second packet, wherein a payload of the second packet comprises one or more time slots.

11. An apparatus for real time packet decryption, comprising:
a processor,
memory in electronic communication with the processor; and
instructions stored in the memory and executable by the processor to cause the apparatus to:
identify, by the apparatus communicatively linked with a primary wireless device, a first nonce value that is set based at least in part on a first packet counter value associated with a data packet stream between a source wireless device and the primary wireless device;
identify a second nonce value that is set based at least in part on a second packet counter value associated with the data packet stream;
receive a first packet from the data packet stream;
determine a sequence number for the first packet based at least in part on receiving the first packet; and
select the first nonce value or the second nonce value based at least in part on the sequence number for the first packet; and
decrypt the first packet using the selected nonce value.

12. The apparatus of claim 11, wherein the instructions to select the first packet are executable by the processor to cause the apparatus to:
select the first nonce value to decrypt the first packet or authenticate the first packet, or both, based at least in part on determining that the sequence number is equal to a first value.

13. The apparatus of claim 11, wherein the instructions to select the first packet are executable by the processor to cause the apparatus to:
  select the second nonce value to decrypt the first packet or authenticate the first packet, or both, based at least in part on determining that the sequence number is equal to a second value.

14. The apparatus of claim 11, wherein the instructions are further executable by the processor to cause the apparatus to:
  detect a cyclic redundancy check (CRC) error on the first packet based at least in part on receiving the first packet and determining whether the first packet is received without error; and
  ignore the first packet based at least in part on detecting the CRC error.

15. The apparatus of claim 14, wherein the instructions are further executable by the processor to cause the apparatus to:
  receive a second packet after receiving the first packet; and
  use the first nonce value to decrypt the second packet or authenticate the second packet, or both, when the determined sequence number includes an indication to use the second nonce value on the first packet.

16. The apparatus of claim 15, wherein the instructions are further executable by the processor to cause the apparatus to:
  use the second nonce value to decrypt the second packet or authenticate the second packet, or both, when the determined sequence number includes an indication to use the first nonce value on the first packet.

17. The apparatus of claim 11, wherein the instructions are further executable by the processor to cause the apparatus to:
  determine that the first packet counter value indicates a count of the first packet as a next packet; and
  determine that the second packet counter value indicates a count of a second packet as a packet after the next packet.

18. The apparatus of claim 11, wherein the instructions are further executable by the processor to cause the apparatus to:
  establish a first wireless link between the primary wireless device and the apparatus based at least in part on powering on the primary wireless device or powering on the apparatus, or both; and
  establish a second wireless link between the primary wireless device and the source wireless device based at least in part on powering on the primary wireless device or powering on the source wireless device, or both.

19. A non-transitory computer-readable medium storing code for real time packet decryption, the code comprising instructions executable by a processor of a secondary wireless device to:
  identify a first nonce value that is set based at least in part on a first packet counter value associated with a data packet stream between a source wireless device and a primary wireless device, the secondary wireless device communicatively linked with the primary wireless device;
  identify a second nonce value that is set based at least in part on a second packet counter value associated with the data packet stream;
  receive a first packet from the data packet stream;
  determine a sequence number for the first packet based at least in part on receiving the first packet; and
  select the first nonce value or the second nonce value based at least in part on the sequence number for the first packet; and
  decrypt the first packet using the selected nonce value.

20. The non-transitory computer-readable medium of claim 19, wherein the instructions to select the first packet are executable to:
  select the first nonce value to decrypt the first packet or authenticate the first packet, or both, based at least in part on determining that the sequence number is equal to a first value.

* * * * *